Nov. 14, 1939.   R. BAADER   2,180,303
FISH TREATING MACHINE AND METHOD
Filed Oct. 24, 1935   18 Sheets-Sheet 1
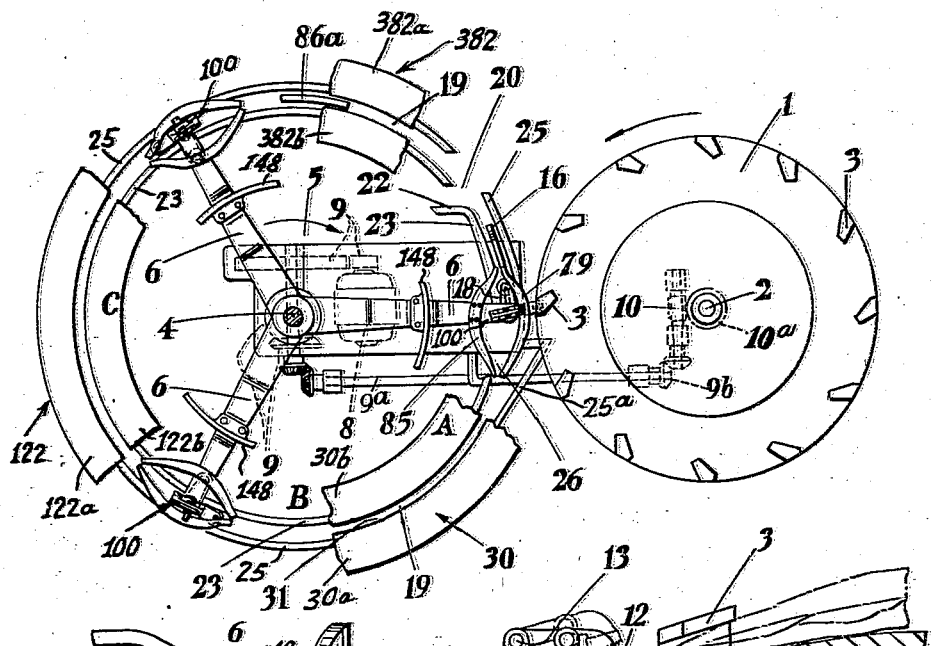
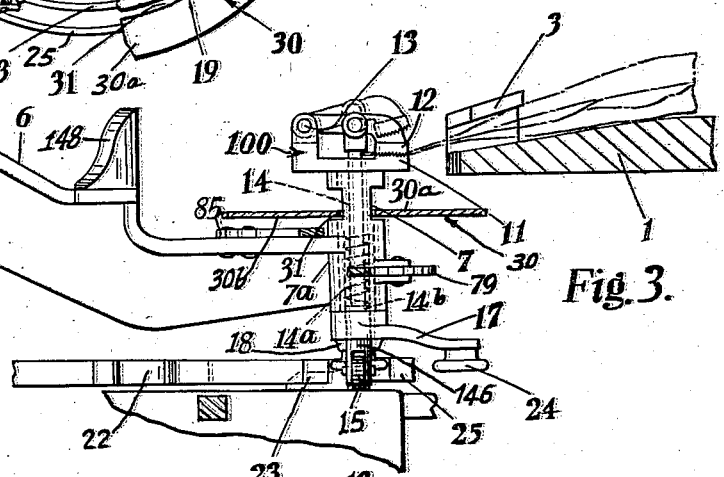
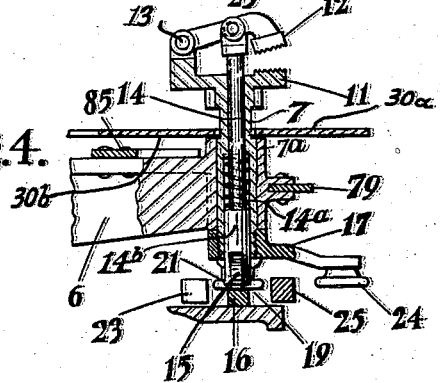
INVENTOR
Rudolf Baader
BY Cox + Moore
ATTORNEYS

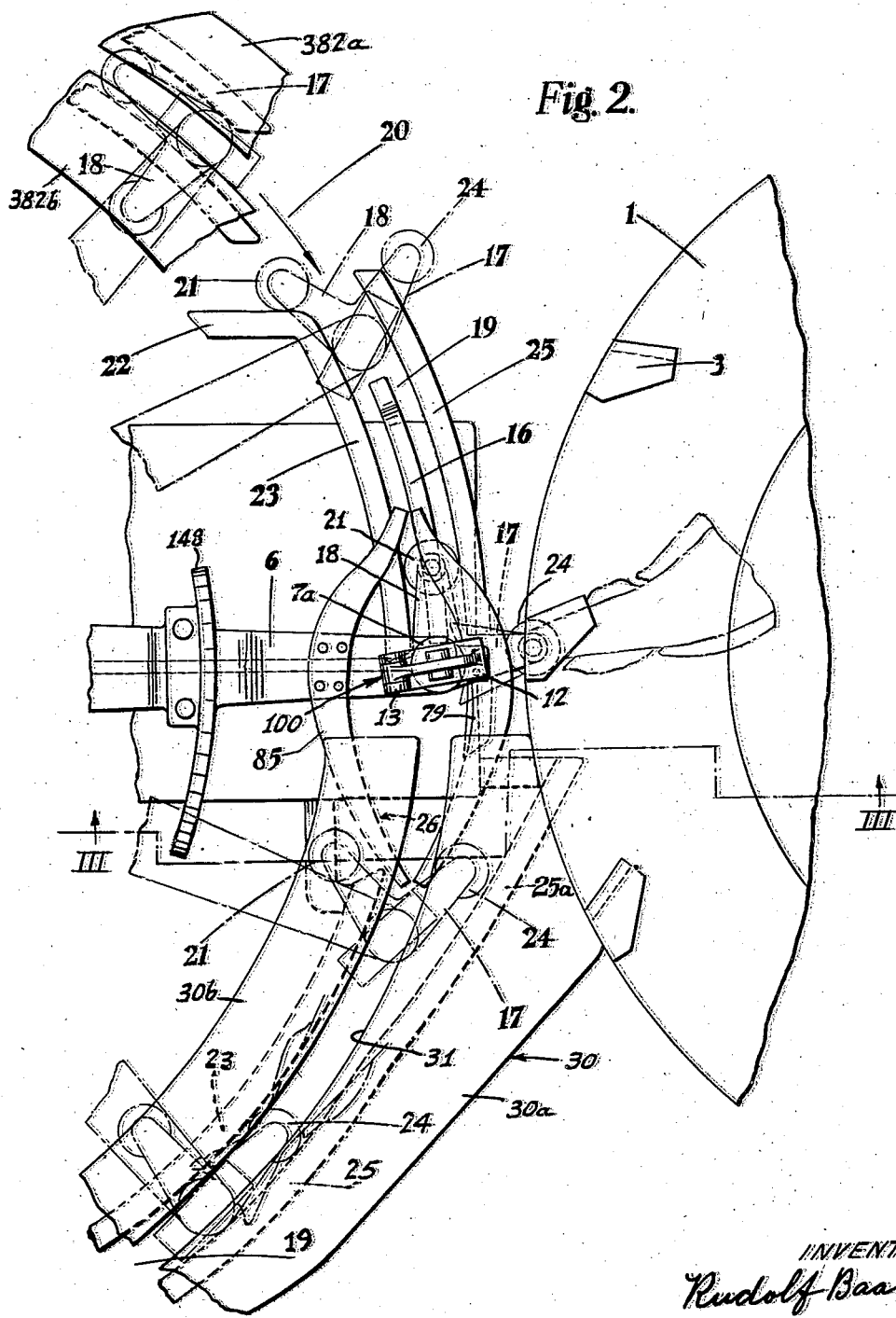

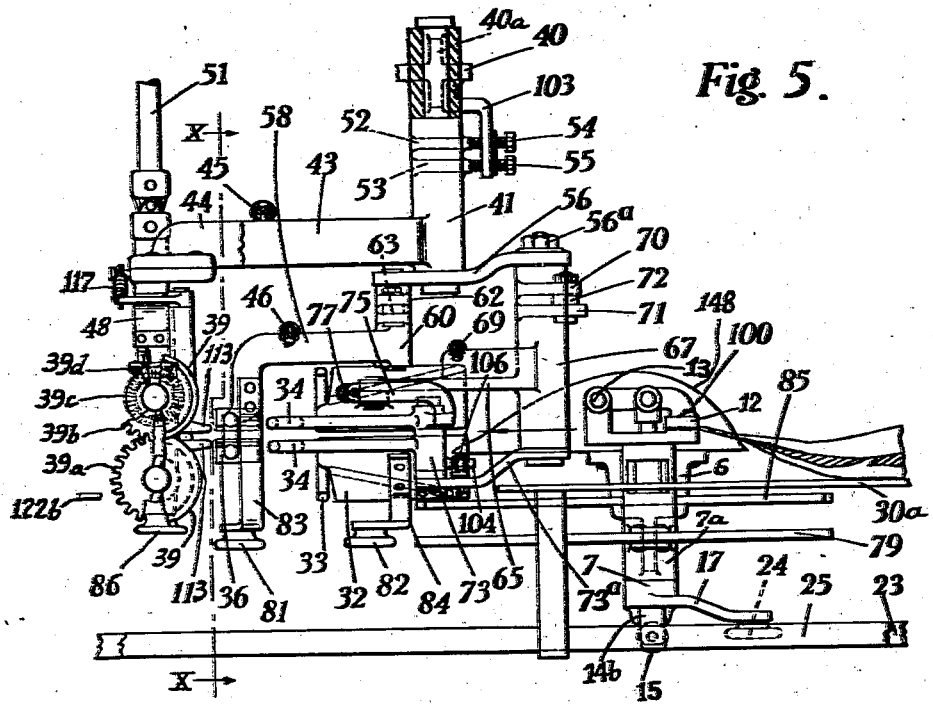
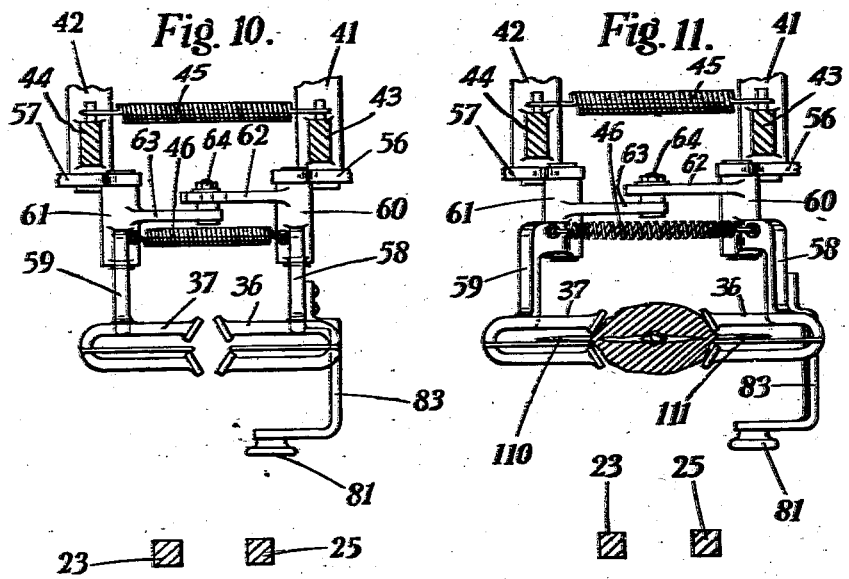

Nov. 14, 1939.   R. BAADER   2,180,303
FISH TREATING MACHINE AND METHOD
Filed Oct. 24, 1935   18 Sheets-Sheet 4

INVENTOR
Rudolf Baader
BY
Cox + Moore
ATTORNEYS

Nov. 14, 1939.  R. BAADER  2,180,303
FISH TREATING MACHINE AND METHOD
Filed Oct. 24, 1935  18 Sheets-Sheet 6
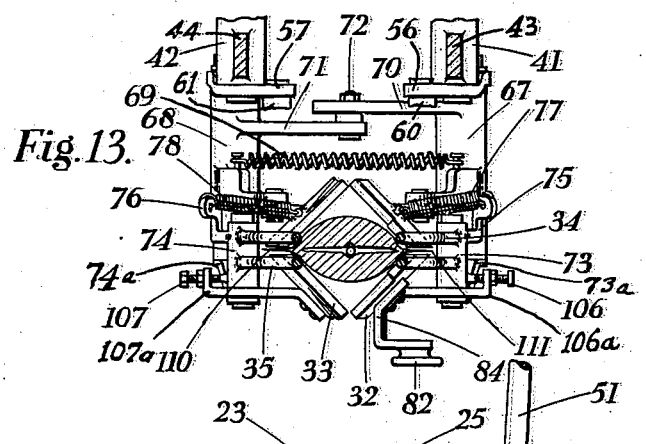
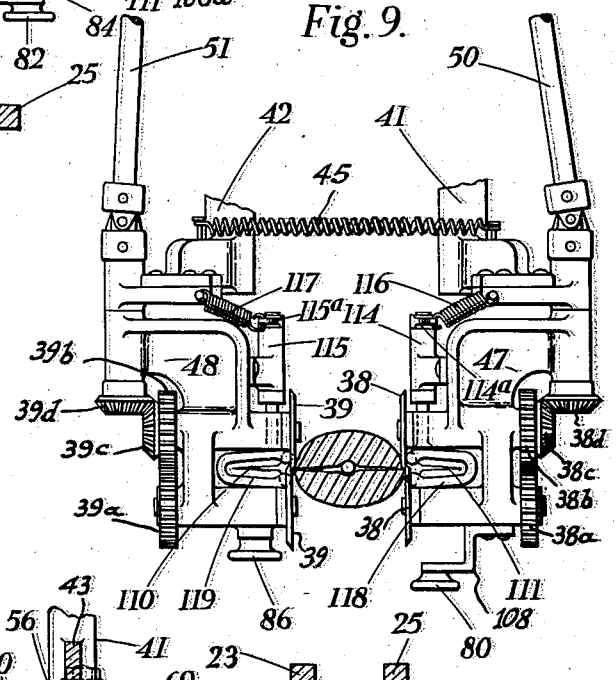
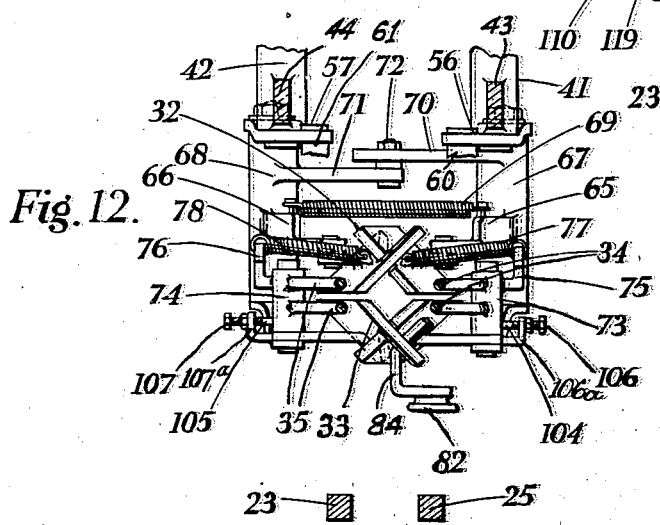
INVENTOR
Rudolf Baader
BY
Cox + Moore
ATTORNEYS

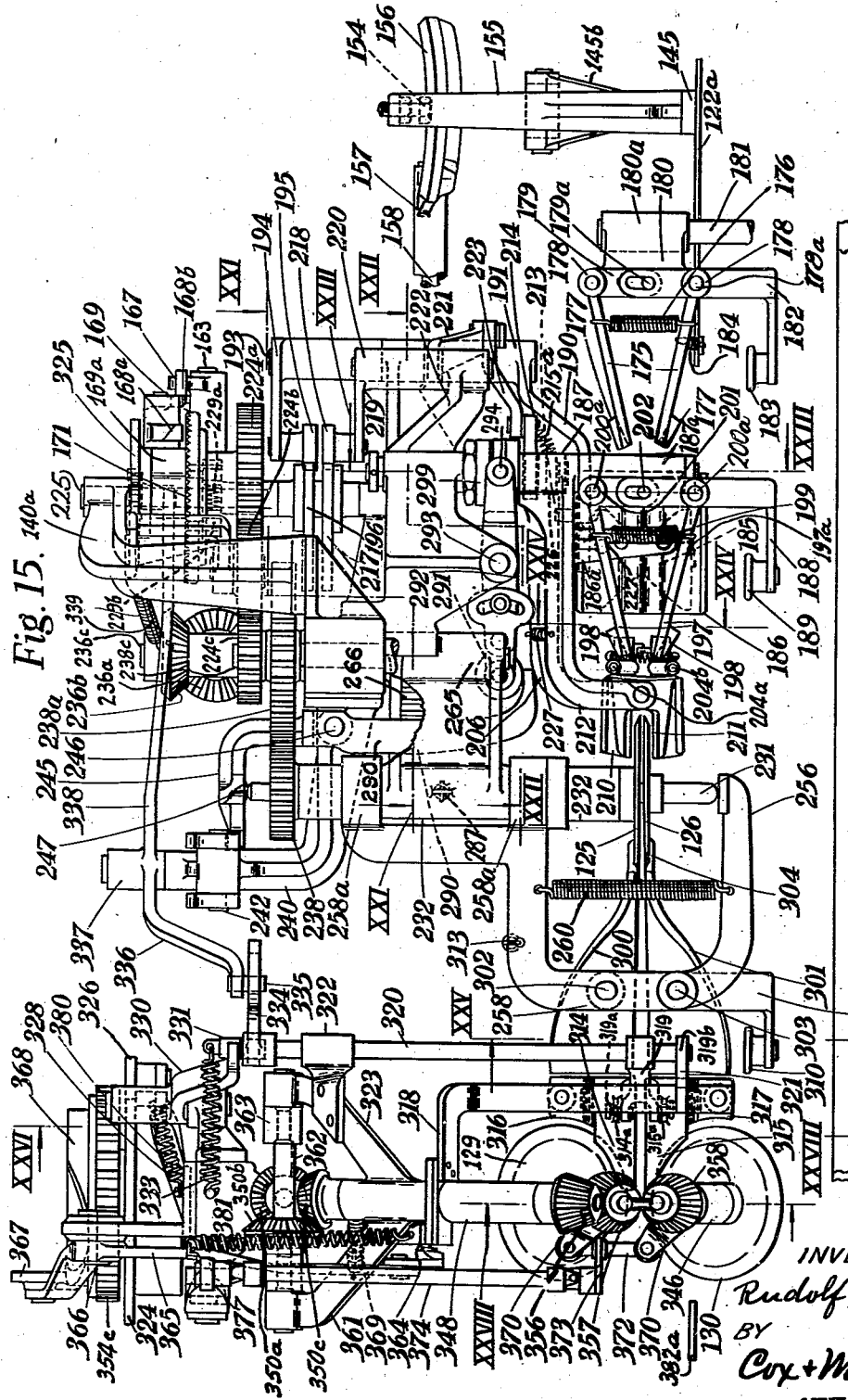

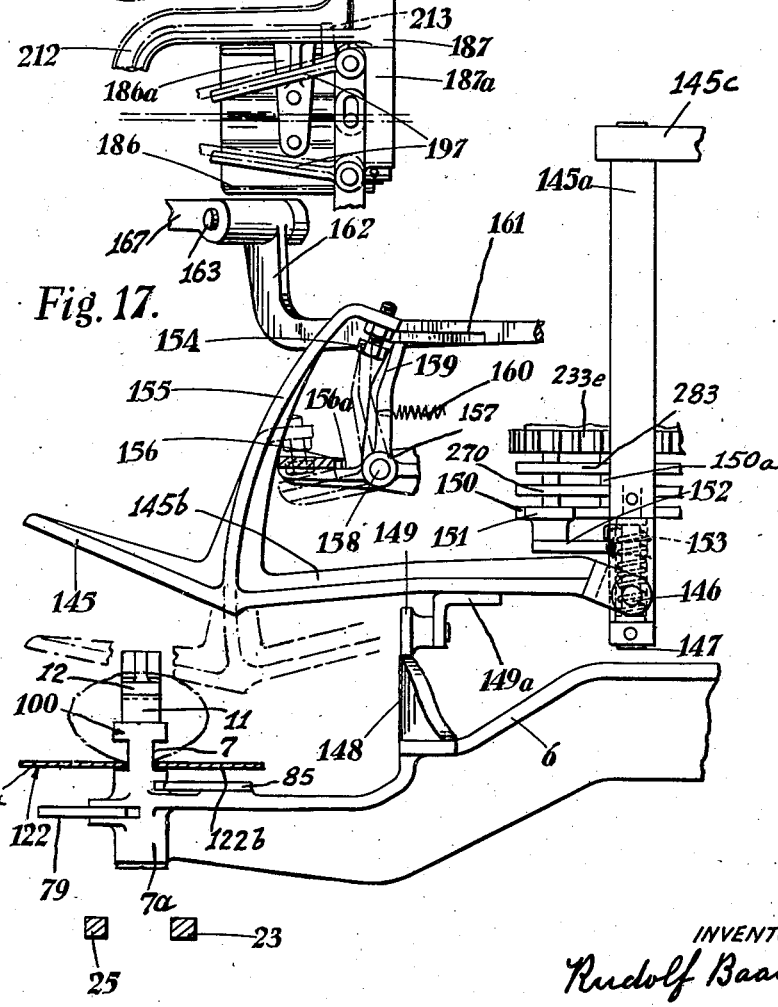

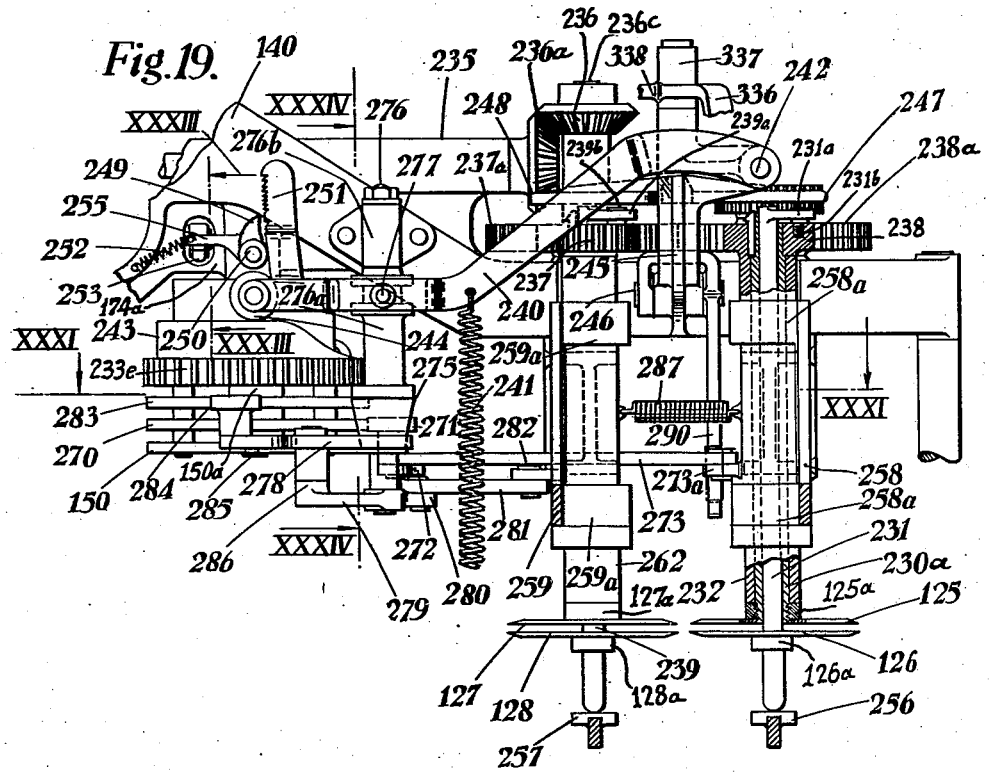

Nov. 14, 1939.   R. BAADER   2,180,303
FISH TREATING MACHINE AND METHOD
Filed Oct. 24, 1935   18 Sheets-Sheet 12
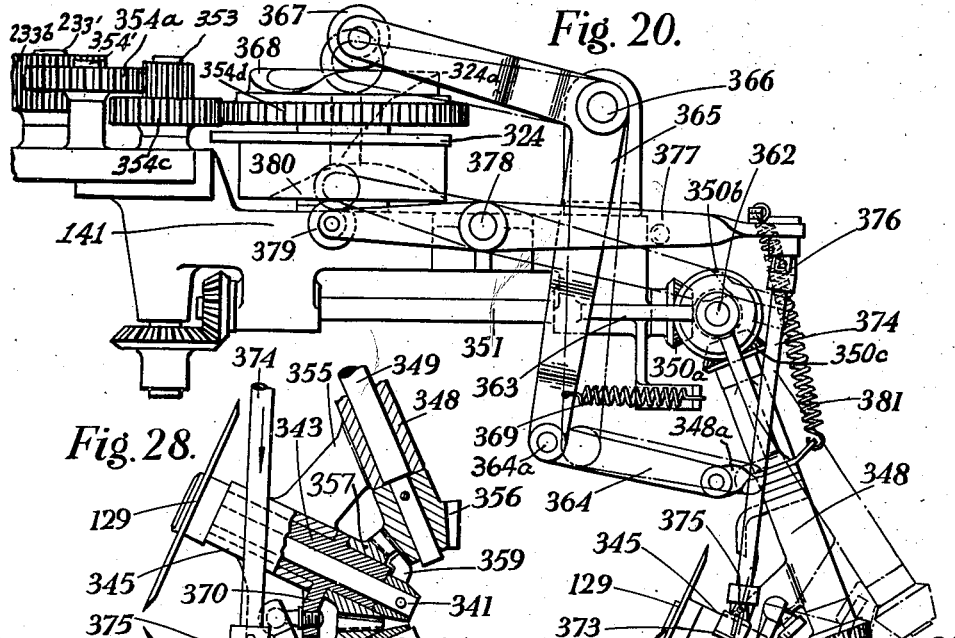
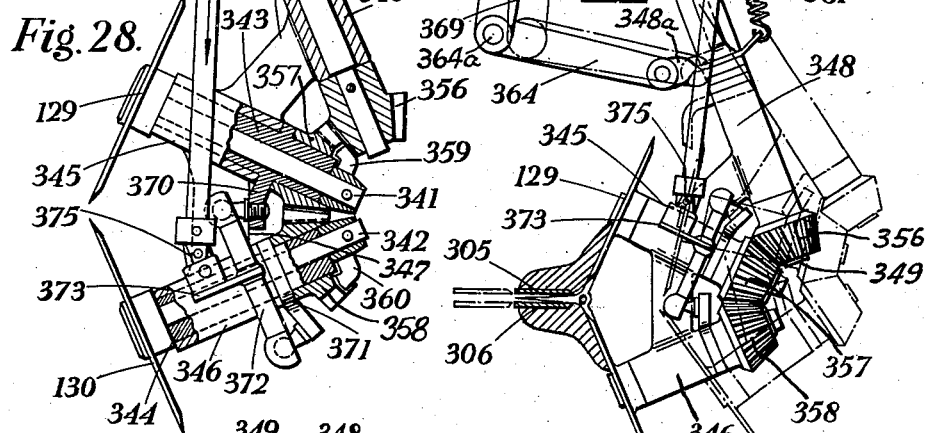
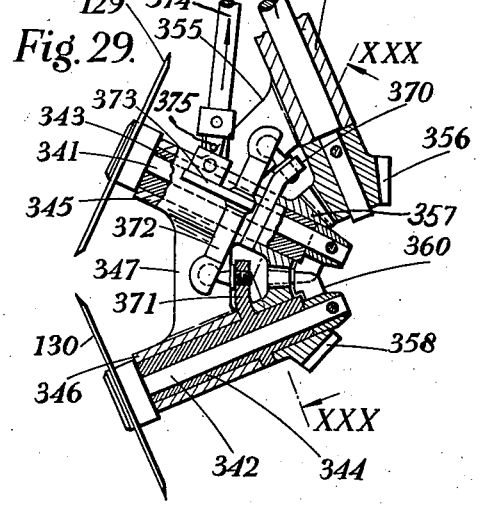
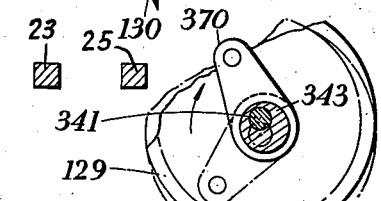
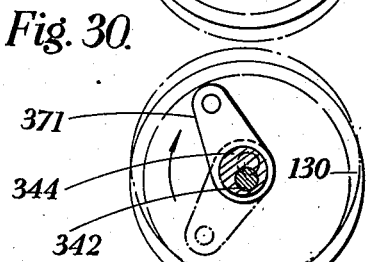
INVENTOR
Rudolf Baader
BY Cox + Moore
ATTORNEYS Nov. 14, 1939.    R. BAADER    2,180,303
FISH TREATING MACHINE AND METHOD
Filed Oct. 24, 1935    18 Sheets-Sheet 13
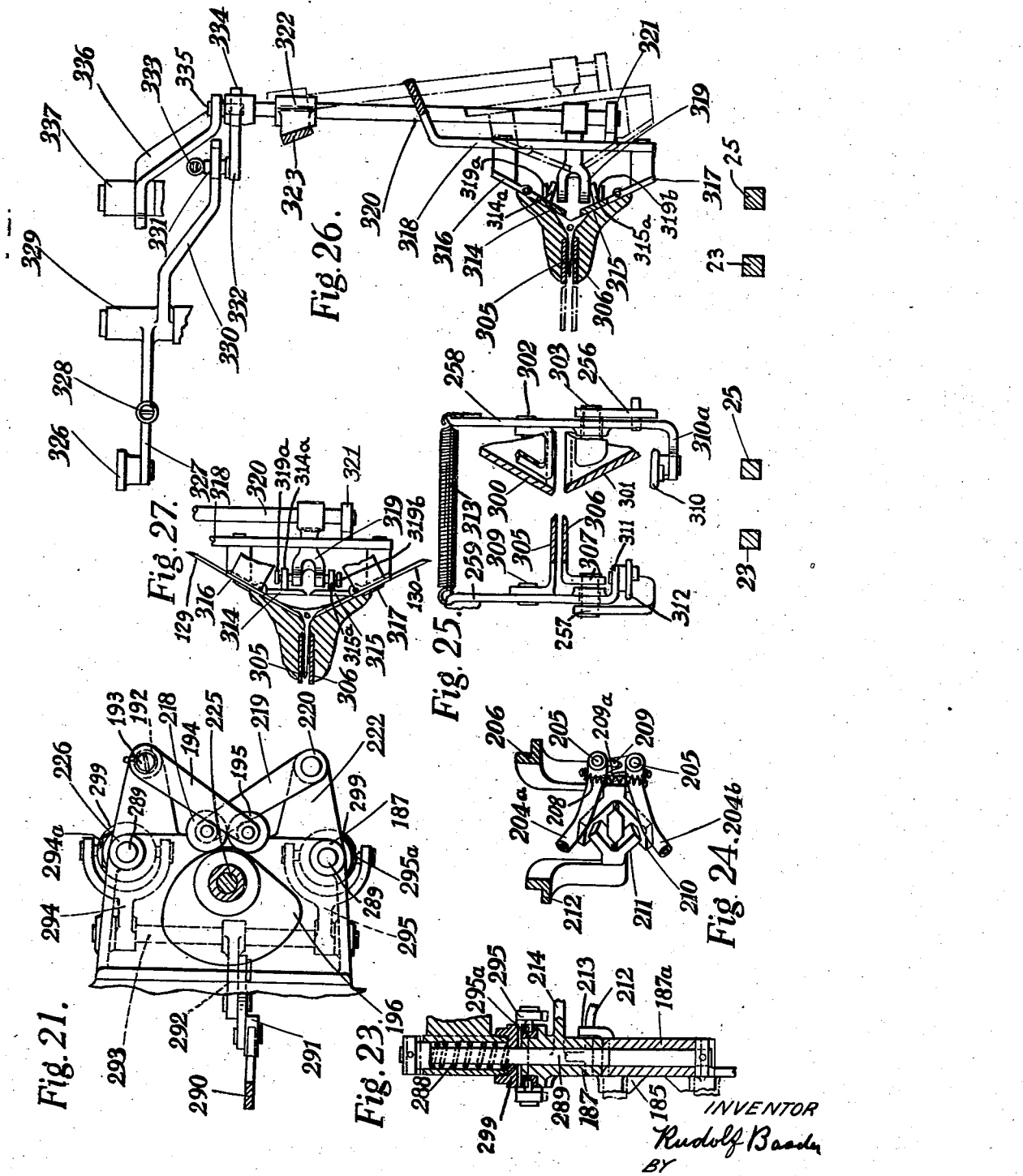
INVENTOR
Rudolf Baader
BY
Cox + Moore
ATTORNEYS Nov. 14, 1939.　　　R. BAADER　　　2,180,303
FISH TREATING MACHINE AND METHOD
Filed Oct. 24, 1935　　18 Sheets-Sheet 14
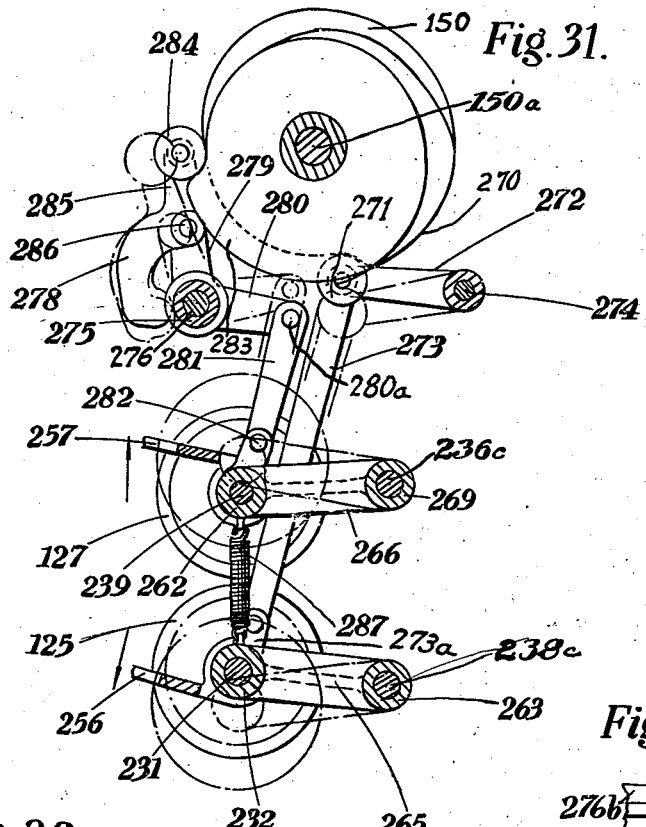
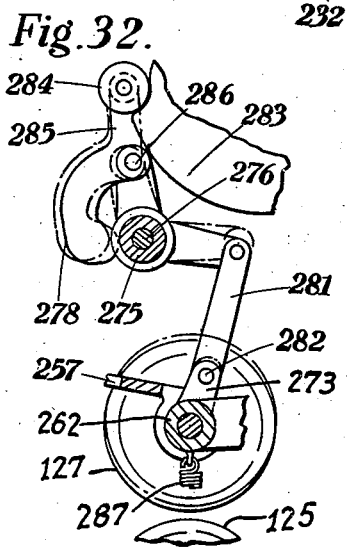
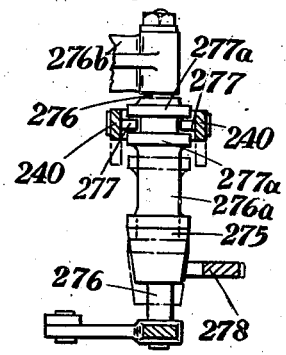
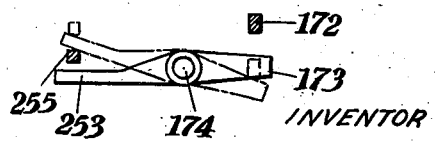
INVENTOR
Rudolf Baader
BY Cox + Moore
ATTORNEYS

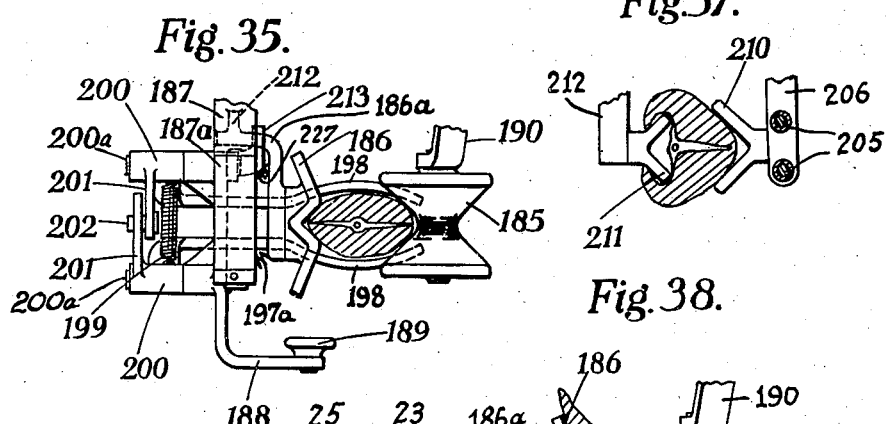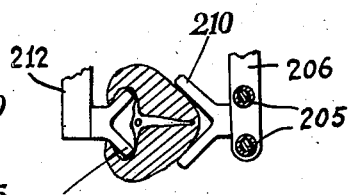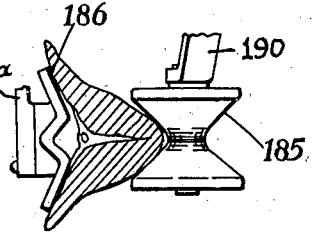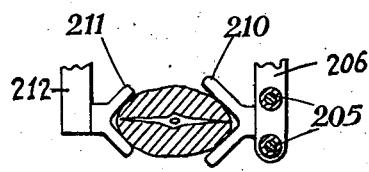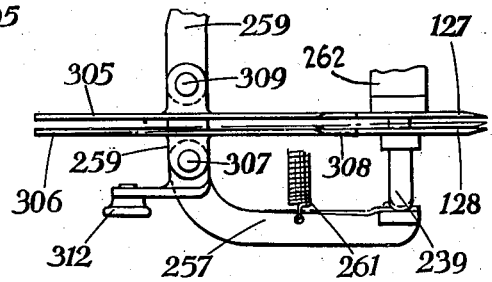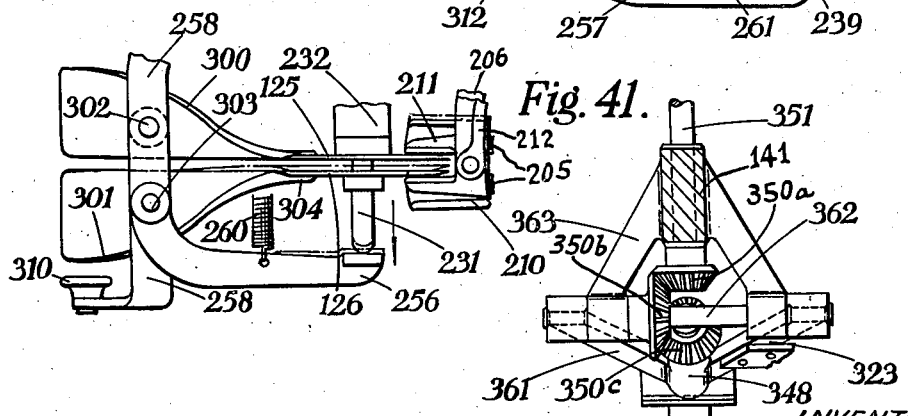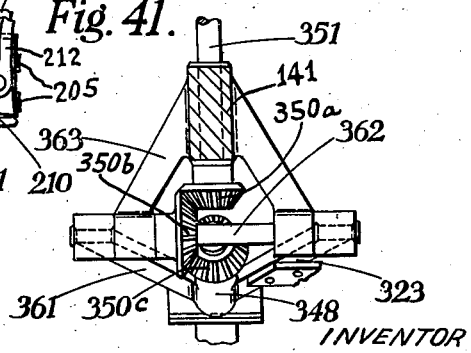

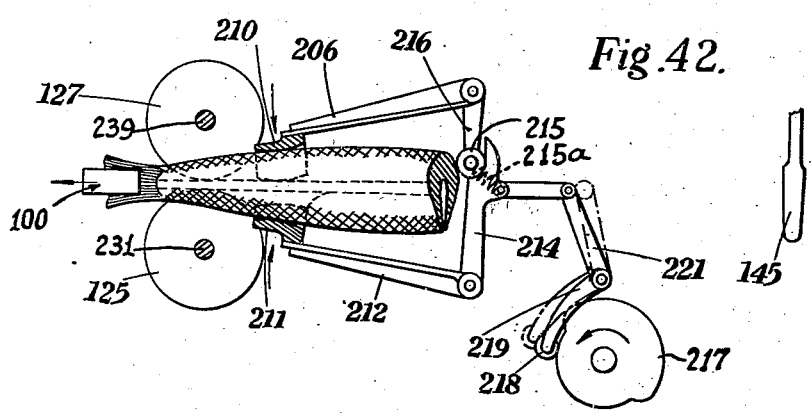
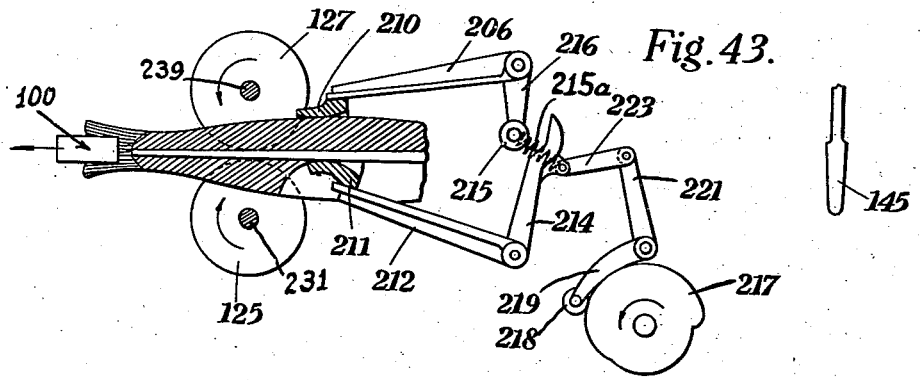

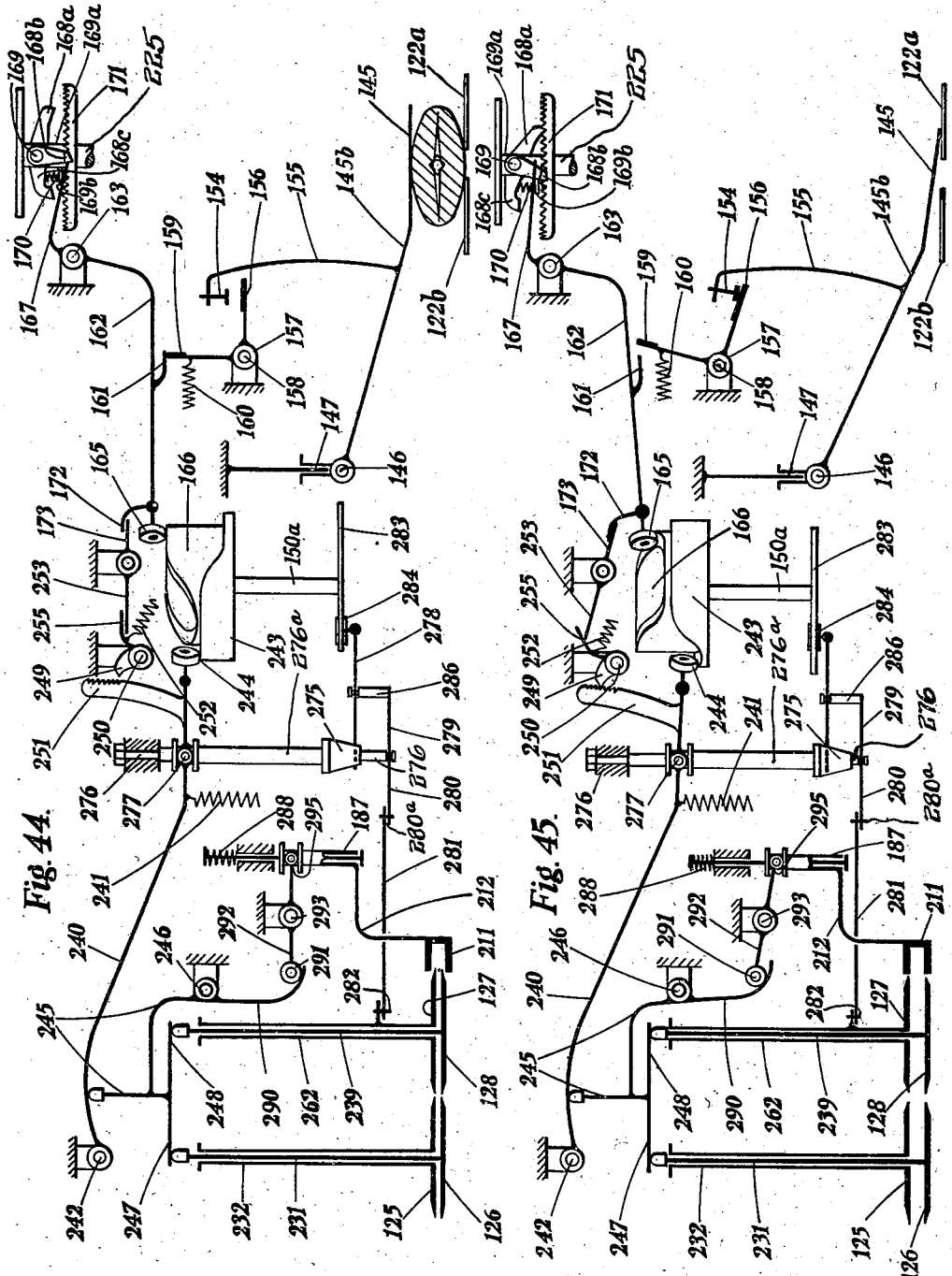

Nov. 14, 1939.   R. BAADER   2,180,303
FISH TREATING MACHINE AND METHOD
Filed Oct. 24, 1935   18 Sheets-Sheet 18

INVENTOR
*Rudolph Baader*
By: *Cox & Moore*
ATTORNEYS.

Patented Nov. 14, 1939

2,180,303

UNITED STATES PATENT OFFICE 2,180,303

FISH TREATING MACHINE AND METHOD

Rudolf Baader, Lubeck, Germany

Application October 24, 1935, Serial No. 46,622
In Germany October 26, 1934

24 Claims. (Cl. 17—3)

This invention relates to methods of and machines for dressing fish and is particularly applicable to the dressing and filleting of fish of large size such as cod, codling, pollack, and the like. These fish have thick and strong backbones which may not ordinarily be bent to an appreciable degree. Because of the difficulty of bending the backbones such fish can not be handled in the ordinary fish treating or dressing machines. Furthermore, the fish alter their shapes slightly under the influence of gravity and when resting on their sides cease to be symmetrical and can not be dressed with accuracy. Action on both dorsal and ventral surfaces of such fish is important in the production of fillets. The fish to be dressed vary in size.

The main object of the present invention is to solve the problem of dressing large fish with such precision that the maximum quantity of sound edible flesh is produced while leaving a minimum quantity on the bones. Further objects include, among others, the provision of a method for dressing large fish, the provision of a machine which will dress large fish, the provision of a new and improved means of moving large fish for action thereupon, the provision of an improved means for removing the fins from fish, the provision of a unique method of dressing fish including conveying the fish through a fixed point and adjusting operating instrumentalities according to the length of a portion of the fish conveyed through said fixed point, the provision of improved means for timing operating instrumentalities, and the provision of an improved means for holding and centering fish to be acted upon. Still further objects include the provision of specific instrumentalities for carrying out the method referred to above.

These objects and other objects which will hereinafter appear are obtained by the novel methods and the unique arrangement and construction of elements hereinafter described and claimed. One machine embodying the present invention and adapted for carrying out the method thereof is disclosed in the accompanying eighteen sheets of drawings hereby made a part of this specification and in which—

Figure 1 is a plan view omitting most of the details of the general layout of a machine embodying the present invention, indicating the stations at which the several steps of the process are carried out;

Figure 2 is an enlarged plan view of the clamp and associated parts;

Figure 3 is a vertical section on line III—III of Figure 2, showing the fish being grasped by the clamp, and about to be carried around on the track 30;

Figure 4 is an elevational detail view of a clamp at the same position as Figure 3, showing part of the clamp mechanism in section in order to illustrate the internal structure;

Figure 5 is a view taken on the line V—V in Figure 6 with parts broken away to more clearly illustrate other parts;

Figure 9 is a detail view of the cutting instrumentalities shown in Figure 8, showing the position of the parts at the time the cutting action of the knives 38 and 39 occurs in the fish;

Figure 10 is a vertical section on the line X—X of Figure 5, parts in the background of the figure having been omitted to more clearly disclose the guides 36 and 37 and associated supporting structure;

Figure 11 is a view similar to that of Figure 10 but with the parts in different working position;

Figure 12 is a vertical section on the line XII—XII of Figure 6, sleeves 60 and 61 having been broken away to more completely illustrate the underlying structure;

Figure 13 is a view similar to that of Figure 12 but with the parts in different working position;

Figure 15 is a side elevation of the fillet cutting mechanism on the line XV—XV of Figure 14, the part 265 being broken away to show a portion of the part 266;

Figure 16 is a detail view on the same plane as that of Figure 15 and showing a part of the guide moving mechanism, overlying parts having been broken away to more completely illustrate the guide moving mechanism;

Figure 17 is a vertical section on the line XVII—XVII of Figure 14, showing the contacting arm;

Figure 19 is a vertical section on the line XIX—XIX of Figure 14, with parts broken away to show the knife-adjusting controls;

Figure 20 is a vertical section on the line XX—XX of Figure 14;

Figure 21 is a horizontal section on the line XXI—XXI of Figure 15;

Figure 22 is a horizontal section on the line XXII—XXII of Figure 15;

Figure 23 is a vertical section on the line XXIII—XXIII of Figure 15;

Figure 24 is a vertical section on the line XXIV—XXIV of Figure 15;

Figure 25 is a vertical section on the line XXV—XXV of Figure 15;

Figure 26 is a vertical section on the line XXVI—XXVI of Figure 15;

Figure 27 is a view similar to part of Figure 26 showing the plates and flaps shown in Figure 26 in different working position;

Figure 28 is a vertical section on the line XXVIII—XXVIII of Figure 15;

Figure 29 is a view of the mechanism shown in Figure 28 with the parts in different working position;

Figure 30 is a section of the mechanism of Figure 29 on line XXX—XXX in Figure 29;

Figure 31 is a horizontal section on the line XXXI—XXXI of Figure 19;

Figure 32 is a view of some of the parts of Figure 31 in different working position;

Figure 33 is a vertical section on the line XXXIII—XXXIII of Figure 19;

Figure 34 is a vertical section on the line XXXIV—XXXIV of Figure 19 showing a part of the device of Figure 19 but in different working position;

Figure 35 is a clarified view of several of the guides;

Figure 36 is a clarified view of the V guides in one position relative to a fish;

Figure 37 is a clarified view of the V guides of Figure 36 in a different and later position relative to a fish;

Figure 38 is a clarified view of the bobbin and W guide in working position with reference to the fish;

Figure 39 is a clarified view of the outer set of horizontal knives and some of the guides associated therewith;

Figure 40 is a clarified view of the inner horizontal knives and a pair of guides associated therewith;

Figure 41 is a detail from above of the mechanism which drives the inclined knives;

Figure 42 illustrates diagrammatically the action of guides 206 and 212 on the fish;

Figure 43 is a view similar to Figure 42 with the parts in a different working position;

Figure 44 illustrates diagrammatically the way in which the plate 145 of arm 145b engages the fish and the operating instrumentalities are adjusted thereby;

Figure 45 is a view similar to Figure 44 with the parts in a different working position;

Like reference characters are used to indicate similar elements in the drawings and in the following description.

Figure 6:
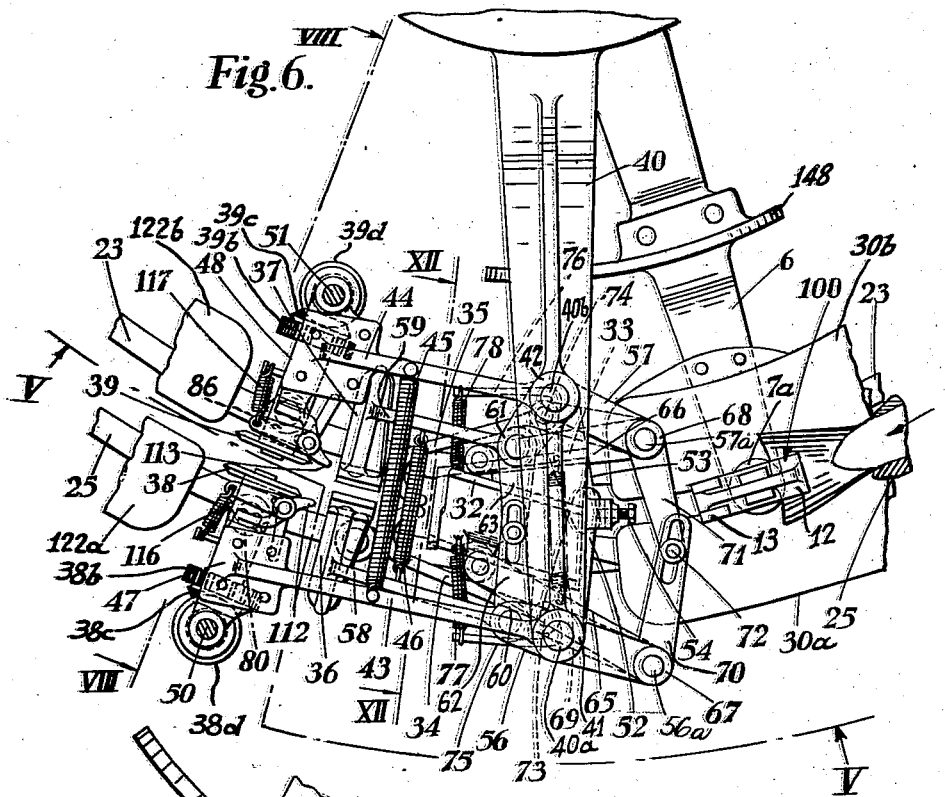
Figure 6 is a plan view partly in section of the mechanism of Figure 8 on line VI—VI of Figure 8.

Fish before being acted upon by the method and devices of this invention are cleaned and decapitated. The fish are then fed tail first to the dressing machine. They are gripped in the machine by the tail and moved tail first through a selected course along which are located the several treating instrumentalities. Guides in each instrumentality position the body of the fish for action thereon. The body is not held continuously in any guide or conveyor, but passes, freely floating, so to speak, through the several guides.

The fish are first moved through guides which lift the fish and straighten the backbones, then fin straighteners lift and straighten bent fins. The guides center the fish for the action of the fin straighteners and holders maintain the fish in centered position. The several guides, holders and tools in the machine contact the dorsal and ventral surfaces of the fish and exert a braking influence on the fish, keeping the backbones substantially straight, a slight curvature being caused by the fact that the path of the fish is circular. As the fish leaves the holders, knives remove the dorsal and ventral fins, cutting slightly below the skin and removing a narrow strip of flesh together with the fins and the pivotal portions at the bases of the fins. The pivotal portions are wider than the spines to which they are attached, and after they are removed knives may cut closer to the spines and backbones than otherwise.

Each fish passes under the end of a contact arm, whose movement is controlled by the portion of fish which passes thereunder, and which regulates in part the action of the machine. It has been found that the bones of a fish vary in size directly with the length of the fish and that the increase in size is substantially uniform from one end of the fish to the other, so that by setting the first group of filleting knives originally according to the length of the fish and opening them uniformly at the same rate a setting is obtained which cuts as close as possible to the bones, leaving the minimum amount of flesh on the bones. The second group of filleting knives is set initially at the same selected separation for all fish and the separation is increased uniformly as the fish passes. A plurality of guides center and hold the fish centered for the action of the knives. The fish lies side up while in the machine and the guides lift it and engage the dorsal and ventral surfaces to hold the fish centered vertically and horizontally.

Each operation is performed on both sides of the fish simultaneously, insuring uniform action.

Figure 1 shows in plan view a part of a machine embodying the present invention. Figure 1 also indicates the stations at which the various steps are carried out. Moving clockwise about the circular track, from station A to station B the fish is straightened and the fins removed and from station B to station C the filleting cuts are made, the fish being contacted for adjusting the filleting means approximately at station B. No attempt is made in Figure 1 to show the several mechanisms involved.

A rotary feeding plate or table 1 initially receives the cleaned and decapitated fish. The table 1 is mounted for rotation on a shaft 2. Projections 3 about the edge of the table extend from the top face of the table and have the upper portions thereof directed backwards with respect to the rotation of the table. The fish are inserted under the said backwardly directed portions of the projections 3, which serve to position the tails to be grasped by clamps.

In the form of device shown the main part of the fish treating device is mounted upon a central standard 5 within which a rotative shaft 4 is driven by an electric motor 8 through gears 9 or in some other suitable manner. A shaft 9a transmits rotatably power through gears 9b and worm 10 meshing with a worm gear 10a on shaft 2 to the feeding table 1.

Radial arms 6, preferably three in number, are mounted on shaft 4 for rotation therewith. At the end of each arm 6 is a clamp holder 7 rotatably mounted in a holder sleeve 7a. A lower clamp jaw 11 is secured to the top of clamp holder 7. An upper jaw 12 is pivoted to jaw 11 at 13. Away from the pivot 13 the jaws 11 and 12 are opposed and are provided with intermeshing teeth which serve to grip the tail of a fish. The clamp in general, comprising the two jaws and associated parts, is indicated by the numeral 100.

Passing through and movable within clamp holder 7 is a rod 14 pivoted to upper jaw 12 near the middle thereof. A spring 14a is about the rod 14 and abuts against a shoulder formed by an enlarged cylindrical portion 14b on the rod to urge the rod and jaw 12 downward. A roller 15 is mounted at the lower end of the enlarged cylindrical portion 14b, see Figures 3 and 4, for the purpose of lifting the rod.

At the bottom of the clamp holder 7 and fixedly secured with respect thereto in the angular relationship shown in Figure 2 are two arms 17 and 18. A roller 24 is mounted on arm 17 and a roller 21 on arm 18. Arms 17 and 18 are at an angle of approximately ninety degrees to each other. The jaws 11 and 12 are approximately in the same vertical plane with arm 17.

At each side of and below the path of the clamp holder 7 at the end of each arm 6 is a track comprising an inner wall 23 and an outer wall 25. Walls 23 and 25 define what may be spoken of as a cam track 19 and extend almost completely around the machine. Just short of the position opposite the feeding table 1 is a gap 20 in the outer wall 25. Opposite the gap 20 a portion 22 of the inner wall 23 is directed inwardly, leaving a gap in the inner wall.

Immediately past the point nearest the feeding table 1 the wall 25 is broken and a part 25a extends outward. A gap 26 is opposite the outward extension. As the arm 6 carries the clamp holder 7 about the track, the roller 24 lies between the walls 23 and 25. When roller 24 comes opposite gap 20 in the outer track 25, the inner roller 21 hits the inward projection 22 of the inner wall 23. The clamp holder is thereby turned, roller 24 passing through gap 20 to the outside of the outer wall 25. The roller 21 is then within the track between the two walls 23 and 25 and the clamp and the jaws 11 and 12 of the clamp are turned to approximately ninety degrees to their path about the track. In this position the jaws 11 and 12 are ready to grip the tail of a fish.

As the arms 6 rotate further the roller 21 comes opposite the gap 26 in the inner wall 23 and the outer roller 24 comes into contact with the outwardly directed portion 25a. The pressure of the outwardly directed portion 25a forces the roller 24 inwardly. The roller 21 passes through gap 26 and the roller 24 again lies within and moves in the track. In this position the clamp jaws 11 and 12 are substantially parallel to their path of movement about the track and are in position to draw a fish about the track.

To operate the clamp jaws 11 and 12 a ramp 16 is mounted between the walls 23 and 25 in position to engage the roller 15 at the bottom of rod 14. Just before the jaws come into position directly opposite the feeding table 1 the roller 15 engages ramp 16, lifting rod 14 and opening the jaws by raising jaw 12. After the rotation of the table 1 has placed the tail of a fish between the jaws 11 and 12, which at this stage face the table 1, the roller 15 runs off the end of ramp 16 and the jaws close on the tail of the fish, holding it securely for the further action upon the fish. After the clamp holder has passed around the track and through all the various instrumentalities the roller 15 engages a second ramp 86a which lifts the upper jaw 12 and releases the tail of the fish.

Two cams, 79 and 85, are secured near the end of arm 6, cam 85 being attached to the upper surface of arm 6 and cam 79 being secured slightly below cam 85 to the outer face of the sleeve 7a at the end of arm 6. Cams 79 and 85 serve to open instrumentalities later to be described to let the clamp holder 7 past.

A support 30 comprising sheet metal plates 30a and 30b, separated by a slot 31 for the passage of the clamp holder 7, is positioned above the walls 23 and 25 to provide surfaces on which the body of the fish may slide as it is drawn by the clamp 100.

*Removing fins*

The fin removing mechanism is illustrated in Figures 5 to 13. Broadly it includes guides 32 and 33 which serve to straighten the backbone of the fish and bring the fish into position for later action thereupon, two pairs of hooks 34 and 35 which straighten the fins of the fish, two holders 36 and 37 which maintain the fins in their straightened position and hold the fish properly centered, and two pairs of rotary disc knives 38 and 39. The knives 38 remove the ventral fins and the knives 39 the dorsal fins, in each case, with a narrow strip of flesh and the pivotal portions of the fins just below the skin.

The fin removing mechanism is supported from a bracket 40 secured to the center column 5. Bracket 40 carries two downwardly depending vertical shafts 40a and 40b. Immediately below the bracket 40 on the shafts 40a and 40b are two sleeves, sleeve 41 on outer shaft 40a and sleeve 42 on the inner shaft 40b. Sleeve 41 is integral with a horizontal arm 43 which bears a bracket 47 at its outer end. Bracket 47 carries the disc knives 38 and their bearings. Sleeve 42 on the inner shaft 40b is integral with a like horizontal arm 44 which bears a bracket 48 similar to bracket 47 and supporting the disc knives 39 and their bearings. A spring 45 is secured at one end to arm 43 and at the other end to arm 44 urging the arms and the knives they carry together.

The knives 38 and 39 are driven through gears 38a, 38b, 38c and 38d, and 39a, 39b, 39c and 39d, respectively, by two universally mounted drive shafts 50 and 51, shaft 50 driving the outer knives 38 and shaft 51 driving the inner knives 39.

Extending inwardly from the outer sleeve 41 is an arm 52. A like arm 53 extends outward from the inner sleeve 42 immediately below the arm 52. A bracket 103 secured to the bracket 40 carries two adjustable stops 54 and 55. Stop 54 is in position to bear upon arm 52 and stop 55 is in position to bear upon arm 53. The stops 54 and 55 together with the arms 52 and 53 serve to determine the closest position of the knives 38 and 39 to each other.

Figure 7:
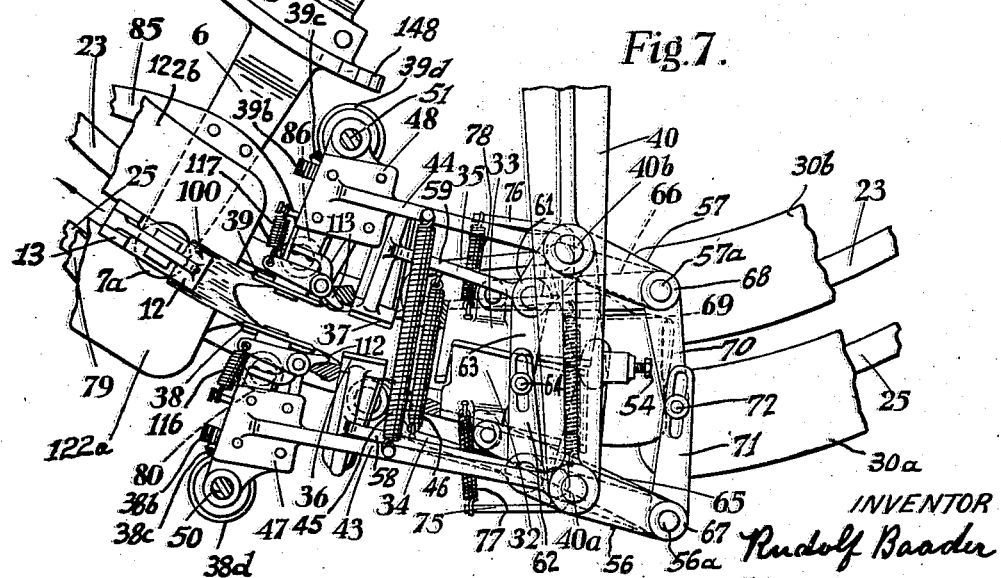
Figure 7 is a view similar to that of Figure 6 but with the parts in different working position.
Figure 8:
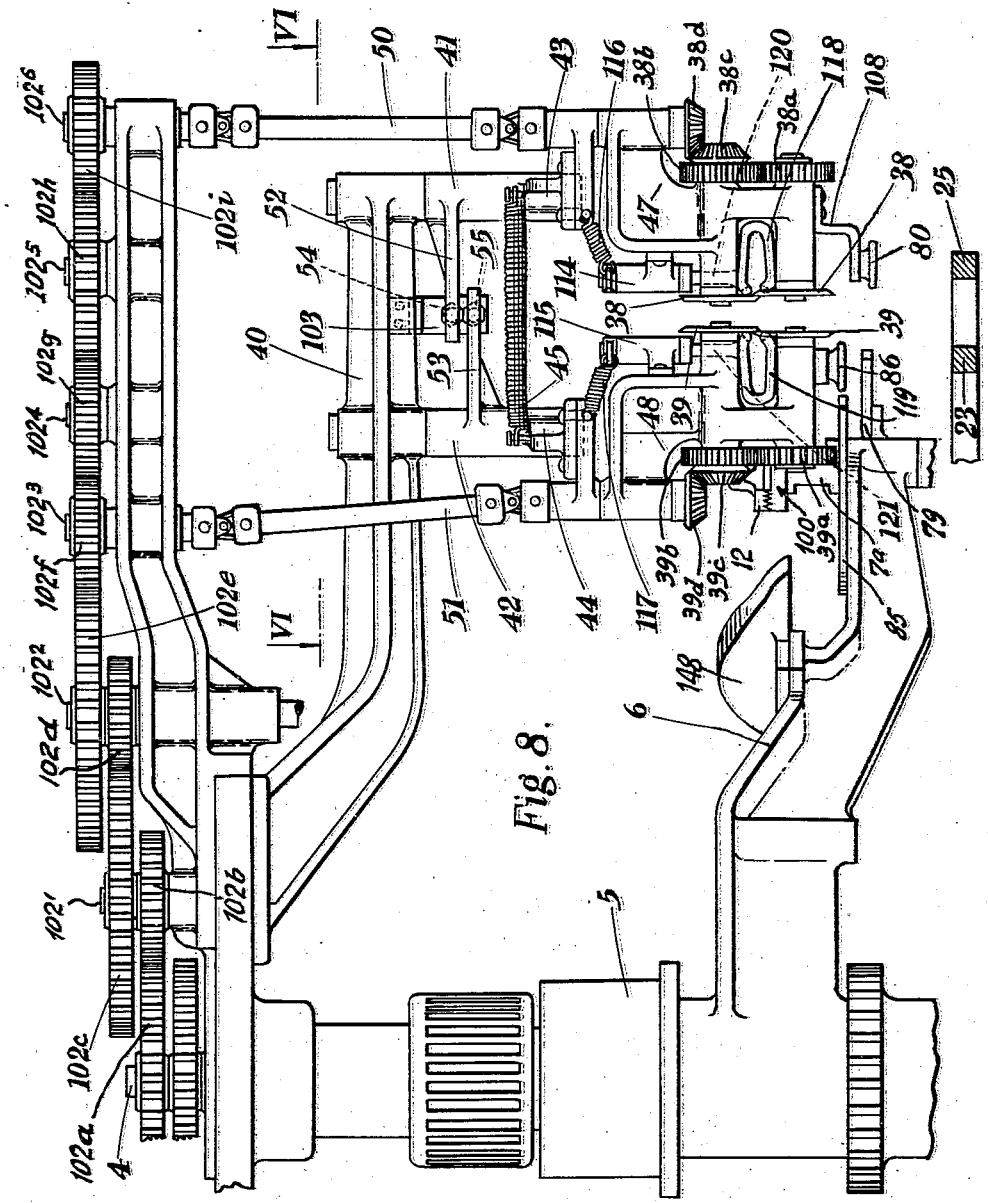
Figure 8 is a vertical section on the line VIII—VIII of Figure 6.

To the lower end of the outer shaft 40a is rotatably secured an arm or bracket 56. A like arm or bracket 57 is secured to the lower end of the inner shaft 40b. As shown in Figures 5, 6 and 7, the right hand ends of arms 56 and 57 carry the guides 32 and 33, and the fin straightening hooks 34 and 35. The left hand ends of the arms 56 and 57 carry the holders 36 and 37.

Sleeve 60 rotatably secured to the left end of arm 56 is integral with a bent arm 58. A like sleeve 61 on the left end of arm 57 is integral with a similar bent arm 59. To the end of arm 58 is secured the holder 36, and to the end of arm 59 is secured the holder 37. A spring 46 has one end attached to each of the arms 58 and 59 and serves to urge them together.

Extending inwardly from sleeve 60 is an arm 62. A like arm 63 extends outwardly from sleeve 61. Arms 62 and 63 overlap with the end of arm 62 above the arm 63. A pin and slot connection 64 joins the arms and ensures that when holders 36 move in one direction the holders 37 will move a like amount in the opposite direction. The movement of the holders is thus symmetrical.

To the right hand end of the arm or bracket 56 a bolt or pin 56a secures a sleeve 67. A like sleeve 68 is secured to the right end of arm 57 by a similar bolt 57a. An arm 65 extends from sleeve 67 and an arm 66 extends from sleeve 68. Arm 65 carries the guide 32. Arm 66 carries the guide 33. Guides 32 and 33 are V-shaped, each with the open mouth toward the other. Parts of each are cut out so that the two may intermesh to approach more closely together than would otherwise be possible. A spring 69 having one end secured to arm 65 and the other end secured to arm 66 urges the two arms and the two guides together. To ensure symmetrical movement of the two guides an arm 70 extends inwardly from the outer sleeve 67, and a corresponding arm 71 extends outwardly from the inner sleeve 68. A pin and slot connection 72 joins the two arms. The two guides 32 and 33 thus move the same amount in opposite directions in the same manner as do the holders 36 and 37.

At the bottom of the sleeve 67 at the right end of the arm 56 on the outer shaft 40a is an arm 73a, rotatably secured by the bolt 56a. A like arm 74a is secured in corresponding position below the sleeve 68 by the bolt or pin 57a. At the end of arm 73a is rotatably mounted a sleeve 73. A corresponding sleeve 74 is likewise mounted at the end of arm 74a. Sleeve 73 carries one pair of fin straighteners 34. Sleeve 74 carries the other pair of fin straighteners 35. The fin straighteners comprised paired bars bent into hook shape, one hook being above the other and the short ends of the hooks extending inwardly toward one another and slightly back toward the sleeves 73 and 74.

On sleeve 73 and extending in the opposite direction from the fin straighteners 34 is a tail piece 104. A like tail piece 105 extends similarly from the sleeve 74. An adjusting screw 106 is carried by a bracket 106a secured to the guide 32. A like adjusting screw 107 is carried by a bracket 107a secured to the guide 33. Adjusting screw 106 provides a stop for tail piece 104 on sleeve 73 and sets a limit to the inward rotation of the fin straighteners 34 with respect to the guide 32. Adjusting screw 107 performs a like function for tail piece 105 and fin straighteners 35.

A second tail piece 75 extends from sleeve 73 in the same general direction as but outside the fin straighteners 34, and a like tail piece 76 on sleeve 74 extends in the same general direction as, and inside the fin straighteners 35. The terms "inside" and "outside" are used with reference to the entire machine, which is generally circular. A spring 77 extends from tail piece 75 to the guide 32 and a spring 78 extends from the tail piece 76 to the guide 33. Springs 77 and 78 ensure that the fin straighteners 34 and 35 move with the guides 32 and 33, but are resiliently displaceable therefrom. The spring 69 which serves to hold the guides 32 and 33 together thus also holds fin straighteners 34 and 35 in the proper position.

It is apparent that the guides, fin straighteners, holders and knives may be rotated in opposite directions to allow the clamp holder 7 and clamp 100 to pass therebetween. This rotation or separation is accomplished by means of the cams 79 and 85 on clamp holder 7 engaging suitably placed rollers on the several instrumentalities to be separated. A roller 80 is secured to a bracket 108 extending downwardly from bracket 47 which carries the disc knives. A roller 86 placed to engage cam 85 is mounted directly on the bracket 48. Roller 80 and the other rollers to be described engage the cam 79. Rollers 80 and 86 cause the knives to be moved aside for the clamp.

A roller 81 is secured to a bracket 83 attached to the arm 58 which carries the holder 36. The movement of the holder 36 is communicated by the mechanism already described to the holder 37.

A roller 82 is mounted upon a bracket 84 which is secured to the guide 32. The motion of guide 32 is likewise communicated to the guide 33 and the two guides carry with them the two fin straighteners 34 and 35.

As the clamp holder 7 moves along its path the cam 79 engages the rollers in succession, successively moving out of the way of the clamp, the guides 32 and 33, the straighteners 34 and 35, and the holders 36 and finally the knives 38. Cam 85 engages roller 86 to move knives 39 out of the way.

The knives 38 and 39 are intended to cut strips from the dorsal and ventral surfaces, respectively, of the fish, cutting below the pivotal portion of each fin, which portion is a short distance below the skin of the fish. To keep the knives 38 and 39 always at the proper location with respect to the fish a pair of feelers 112 and 113 are provided to press against the fish and limit the movement of the knives toward the fish accordingly. The feeler 112 for knives 38 is fixed to the bottom of a shaft 120, which is pivoted in a sleeve 114 secured to bracket 47. Feeler 113 is fixed to the bottom of a like shaft 121 pivoted in a sleeve 115 secured to the bracket 48. At the top of sleeve 114 an arm 114a is secured non-rotatively to the shaft 120. A similar arm 115a is secured to the top of rod 121 above sleeve 115. A spring 116 extends from the end of arm 114a to bracket 47 and a spring 117 runs from arm 115a to bracket 48. Springs 116 and 117 allow the feelers to yield when necessary but are so strong that the feelers and the knives generally move as a unit.

The fins 110 and 111, when they are cut off from the fish, extend into the cavity behind the knives in brackets 47 and 48. There they are received by holders 118 and 119 secured to rods 120 and 121.

Past the knives 38 and 39 is a support 122, similar to the support 30, previously described, and comprising sheet metal plates 122a and 122b. Support 122 sustains the body of the fish until it reaches the next instrumentalities in the machine.

The power for rotating the knives 38 and 39 is obtained from the central shaft 4 through gear wheels 102a, 102b, 102c, 102d, 102e, 102f, 102g, 102h and 102i, carried by shafts $102^1$, $102^2$, $102^3$, $102^4$, $102^5$ and $102^6$. or other suitable power transmission means.

Fillet cutting

At the end of the support 122 away from the fin straightening and removing mechanism the fish passes into a division of the machine which centers and holds it and makes cuts in the flesh along the spines extending above and below the backbone in the trunk of the fish between the belly cavity and the tail, and cuts above the ribs about the belly cavity, thus separating the fillets from the bony structure except for a narrow strip on each side of the backbone. Rotary disc knives 125 and 126 make cuts along the ventral surface of the fish, and similar knives 127 and 128 make similar cuts along the dorsal surface of the fish. Two inclined disc knives 129 and 130 cut inside of the belly flaps to free the ribs.

The knives and their associated guides and operating mechanism are supported by two radial brackets. Bracket 140 is shown near the center of Figure 14 and near the top in Figure 15, and bracket 141 is shown at the left side of Figure 14. Brackets 140 and 141 are secured to the central column 5.

Before the fish passes to the guides it passes under a contacting plate 145 of an arm 145b. The arm 145b is pivoted for vertical movement at 146 and for horizontal movement at 147 to a column 145a which is supported by a bracket or plate 145c supported on central column 5. A bracket 149a on the lower face of arm 145b carries a roller 149. A ramp 148 secured to the arm 6 cooperates with the roller 149 and lifts the arm 145b, letting the clamp 100 past and holding the arm up until after the clamp carrying a fish is moved three hundred millimeters past the plate 145. Thus if a fish 300 millimeters or less long is carried by the clamp 100 the plate 145 will fall directly to the support 122. If the fish is longer than three hundred millimeters the plate 145 will fall upon the fish and will drop to the support 122 only when the end of the fish passes.

Figure 14:
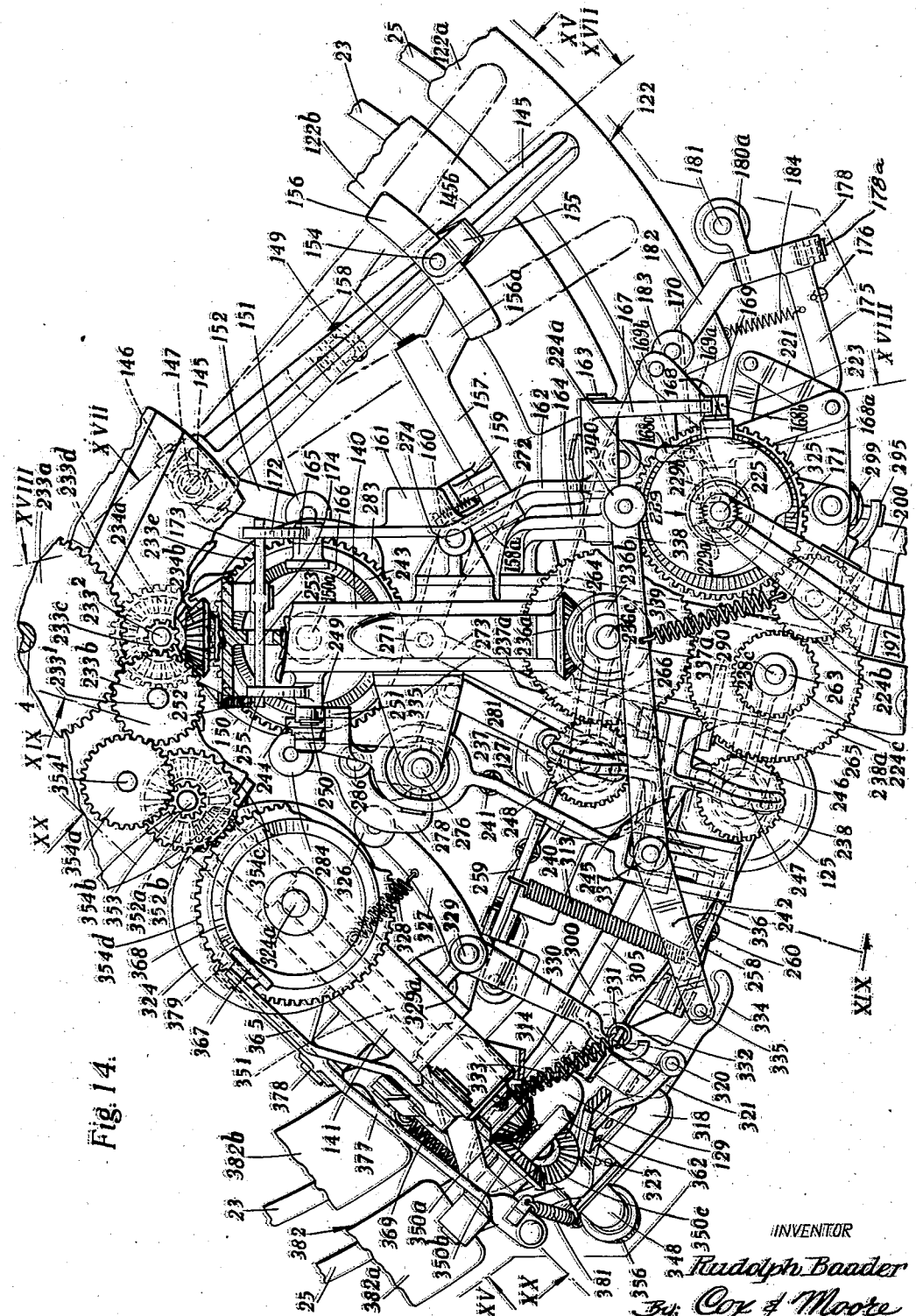
Figure 14 is a plan view of the fillet cutting mechanism at station B to C of Figure 1.

At the moment of its release from the lifting force of the ramp 148 the plate 145 is in the left hand dot-and-dash line position shown in Figure 14. It is immediately moved to the right and finally assumes the position shown in dot-and-dash lines at the right in Figure 14. This horizontal movement is produced by a cam 150 mounted on a shaft 150a beneath the radial bracket 140 and driven by the gear 233a on shaft 4, idler 233b, on shaft 233¹, gear 233c fixed to shaft 233², gear 233d fixed to the lower end of the same shaft, and gear 233e fixed to shaft 150a. Cam 150 acts on a roller 151 which is carried by an arm 152 secured to the column 145a to which arm 145b is pivoted. A spring 153 holds the roller 151 against the cam 150 and urges the arm 145b and its plate into its original or left hand position.

The arm 145b controls the machine in accordance with the length of any fish over three hundred millimeters. As the plate 145 falls at the end of the fish it sets other mechanisms in action and these mechanisms operate at a selected and constant speed to carry out the other operations of the machine, causing the several parts to move to allow for the change in size and shape of the fish from tail end to the head end.

When plate 145 falls the adjusting screw 154, carried by an arm 155 extending upward from arm 145b, hits against a plate 156 which is rigid with an arm 156a. Arm 156a is carried by a sleeve 157 having an upstanding arm 159. The arms and sleeve are pivoted on a shaft 158 carried by a bracket 158a rigid with the bracket 140. A spring 160 holds the arm 159 in its right hand position as shown in Figure 17, holding the plate 156 in its upper position. When plate 145 drops the adjusting screw 154 presses the plate 156 downward, causing arm 159 to move to the left.

Figure 18:
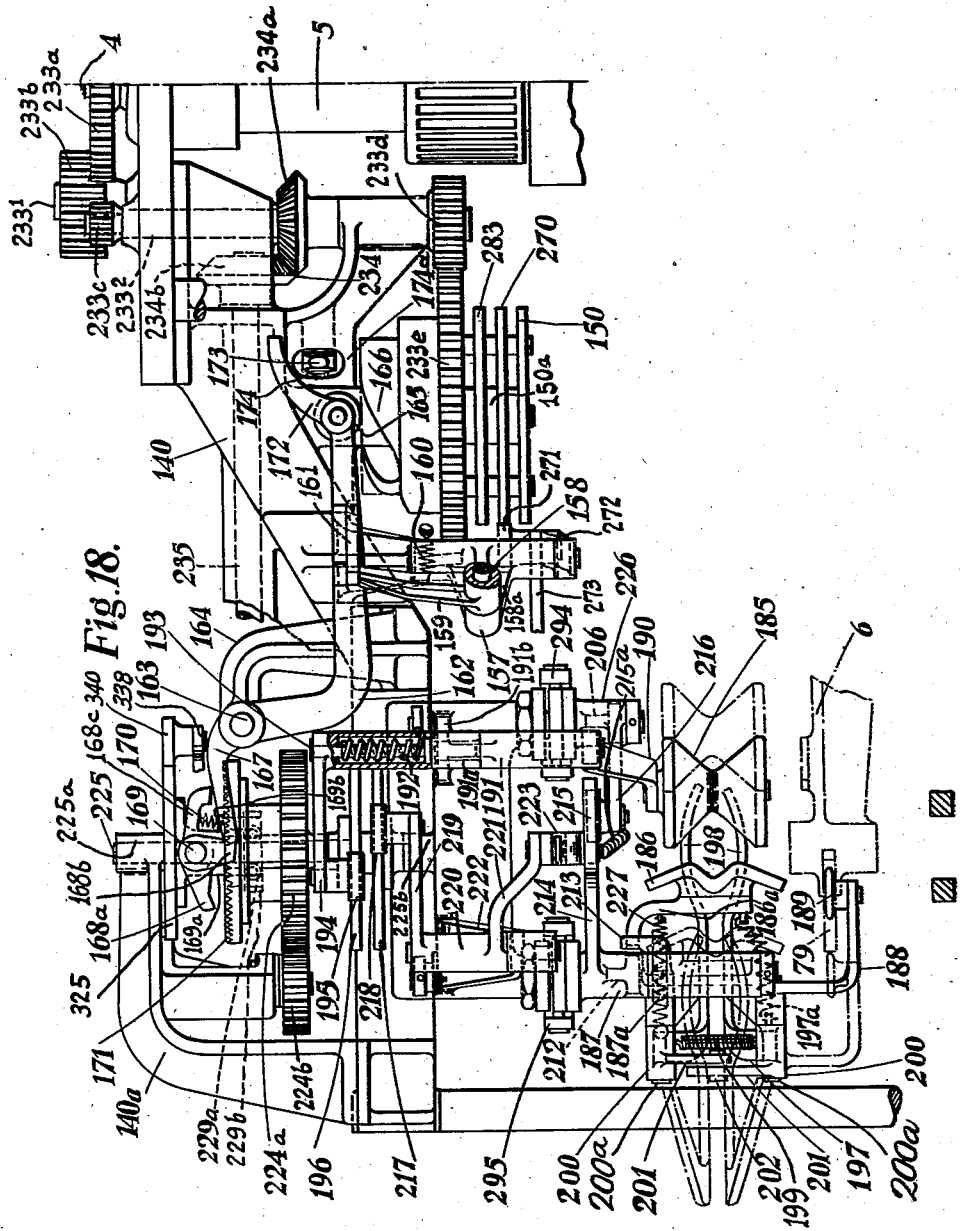
Figure 18 is a vertical section on the line XVIII—XVIII of Figure 14.
Figure 46:
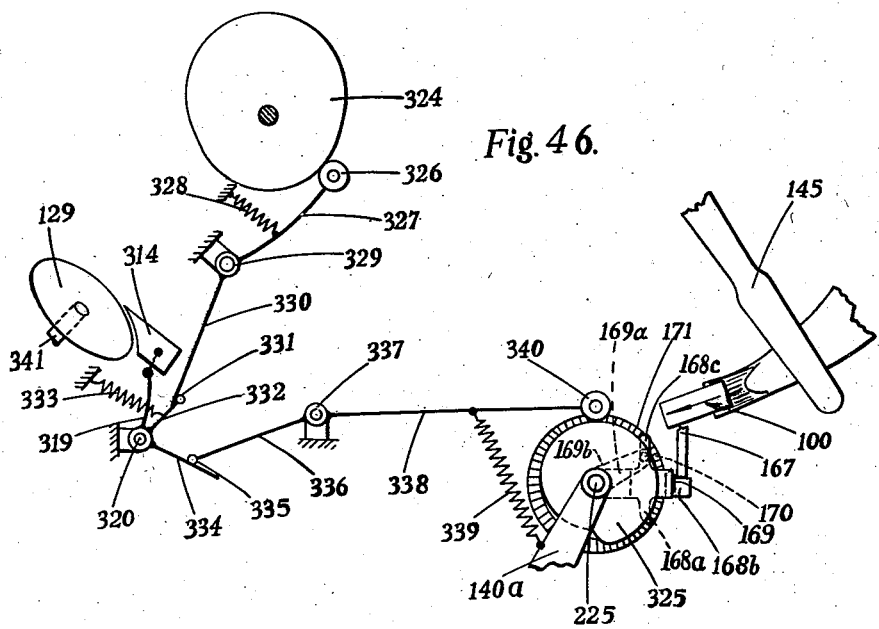
Figure 46 illustrates diagrammatically the way in which cams 324 and 325 control the engagement of flap-holding plates with the fish.
Figure 47:
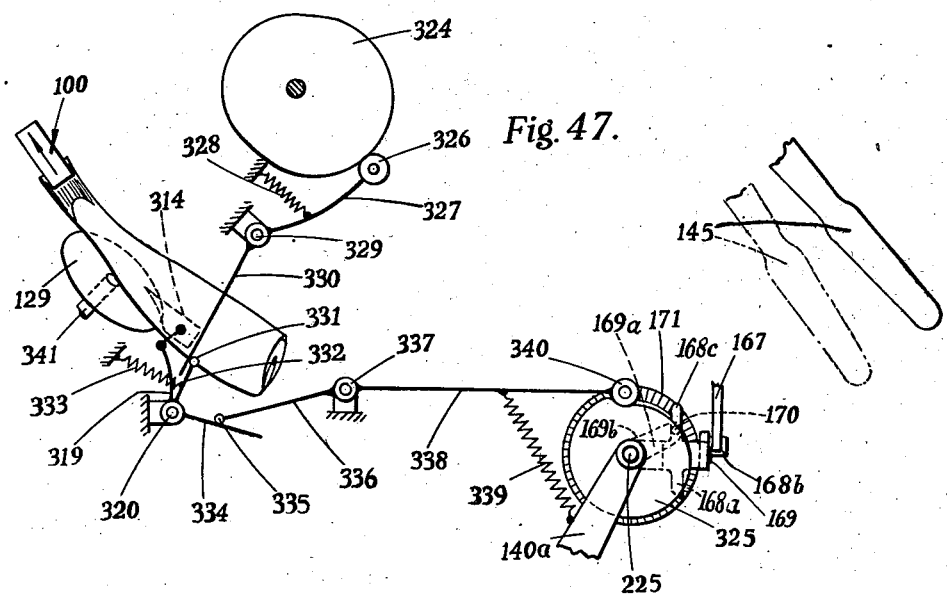
Figure 47 is a view similar to Figure 46 with the parts in a different working position.

The movement of arm 159 to the left releases a projection 161 on an arm 162, which thereupon falls to a lowermost position as determined by the position of a cylindrical cam 166 (Figures 14 and 18) which is keyed to shaft 150a. The cam 166 is driven by the gearing so as to rotate three times as fast as the shaft 4. The arm 162 is pivotally mounted on the pivot 163 fixed to the bracket 164 extending upward from the bracket 140, and has a tail piece 167 extending beyond the pivot 163 which is adapted, by means presently to be described, to control the position of fish-treating instrumentalities in accordance with the movement of the plate 145.

The shaft 225 is rotatably mounted in a bearing 225a at the end of bracket 140a and the lower bearing 225b at the end of the bracket 140. The shaft 225 is not continuously driven, but is driven through a friction clutch 229 by a crown wheel 171 which is continuously driven by the transmission means, including the gears 233a, 233b, and 233c, that drive the cam 166 and the bevel gears 234a on shaft 233², bevel gear 234b meshing therewith and which rotates shaft 235, bevel gear 236a, meshing with gear 236b, which is fixed to shaft 236c, this rotating the spur gear 237a fixed to the same shaft. Spur gear 237a drives the gear 238a, which is fixed to the same shaft 238c as gear 224c. Shafts 236c and 238c are rotatably mounted in the bracket 140a and equidistant from the axis of the shaft 225. Gear 224c drives, through idler 224b, the gear 224a which is loose on shaft 225, and which drives the crown wheel 171. The friction clutch 229 comprising the friction blocks 229a and cooperating cylindrical skirt 229b permits the shaft 225 to remain stationary when a dog 168b is in contact with the end of the tail piece 167 of the arm 162. This dog 168b forms part of a latch member 168 which also comprises a pawl 168a and a tail 168c and which is pivotally mounted on pivot 169 fixed to a boss 169a which is keyed to the shaft 225, the axis of the pivot being radial to the boss. A spring 170 is secured to the tail 168c and at its lower end to an extension 169b of the boss so that it tends to urge the pawl 168a into contact with the teeth of the crown wheel.

When the arm 162 is lowered by the fall of the follower roller 165, due to rotation of the cam 166, the dog 168b is freed and the tension of the spring 170 brings the pawl 168a into engagement with a tooth of the crown wheel 171. The crown wheel then causes the shaft 225 to rotate. In the normal operation of the machine, the shaft 225 will rotate only once, since the tail piece 167 will meanwhile, through the rotation of cam 166, have been returned to its lowest position, where it contacts the dog 168b, lifting the pawl 168a out of engagement with the teeth of the wheel 171. If there were no friction coupling 229 the spring 170 would rock the latch downwards again, but by virtue of the presence of the friction coupling a turning moment is exerted on the spindle 225 and thus on the latch so that the latch is forced against the tail 167. The force exerted on the latch through the friction coupling is sufficient to overcome that exerted on it by the spring so that the latch is held until the tail 167 is again moved upwards.

At the other end of the arm 162 and extending above the roller 165, an extension 172 of the arm 162 makes contact with and presses downwardly upon one arm 173 of a two armed lever pivoted at 174 in an extension 174a of bracket 140.

The dropping of the arm 45b with its action on the latch 168 and upon the arm 162 initiates movements of the several parts of the mechanism to act on the fish, their movement being thereby adjusted according to the length of the fish.

Past the contacting plate 145 the fish moves into a tweezer guide comprising two arms 175 having a spring 176 between them to urge them together and having curved guide surfaces 177 at the ends of the arms, which press upon the sides of the fish under the action of spring 176. The arms 175 are rigid with sleeves 178 and with arms 179 which extend from each sleeve 178 toward the other. A pin and slot connection 179a between arms 179 insures that the two arms 175 move symmetrically.

The sleeves 178 are pivoted at studs 178a to a bracket 180 which is carried by sleeve 180a on a rod 181 suitably secured to the base of the machine. Extending downwardly from the bracket 180 an arm 182 carries a roller 183 which is adapted to cooperate with the cam 79 to swing the tweezer guides out of the way of the clamp 100. Cam 79 turns the guides aside against the pull of a spring 184 which extends from the lower arm 175 to the support plate 122a.

The tweezer guides lift the fish from the level of the support 122 and center it vertically and to some degree horizontally with respect to the following mechanisms.

After leaving the tweezer guides the fish passes between a bobbin guide 185 and a W-shaped plate guide 186 is carried by an arm 186a attached to an arm 212 which in turn is secured to an upper sleeve 187. The bobbin guide 185 is carried by an arm 190 secured to a sleeve 191. The sleeve 191 is carried by spindle 193 which is mounted in bearings in a sleeve 191a rigid with a bracket 191b on the bracket 140. A spring 192 within sleeve 191a urges the lower sleeve 191 together with the arm 190 and the bobbin guide 185 in a clockwise direction as seen from above. An arm 194 is secured to the top of spindle 193 and carries a roller 195 which cooperates with a cam 196 on shaft 225 to move the bobbin guide in and out. The pressure from spring 192 holds the roller 195 against the cam 196. Urged by cam 196, the guide 185 first moves away from the track to allow the clamp 100 to pass, and then returns toward the track, immediately starting a slow movement away to allow for the increasing size of the fish from tail to head.

A second pair of tweezer guides is carried by the lower sleeve 187a and comprises two arms 197 having curved guide surfaces 198 and urged together by a spring 199 extending between the arms. The arms 197 are pivoted by sleeves 200 for vertical movement on pins 200a which extend from the lower sleeve 187a. The arms 197 are urged inwardly by spring 197a. An arm 201 extends from each sleeve 200, the arms 201 overlapping and being connected by a pin and slot 202 to ensure symmetrical vertical movement of the arms 197.

From the second tweezer guides the fish passes between two V-shaped guides 210 and 211. Guide 211 is adapted to fit first about the ventral surface of the trunk of a fish, moving slowly outward to accommodate the diverging shape of the fish, and then when the belly cavity is reached move into the cavity and hold the fish by contact with the inside thereof. The similar but larger guide 210 is adapted to fit about the dorsal surface of the fish. The action of these guides is shown in Figure 37 and diagrammatically in Figures 42 and 43.

Extending downwardly from sleeve 187a is an arm 188 carrying a roller 189 which is placed to cooperate with the cam 79. The passage of cam 79 rotates the sleeve 187a, moving the tweezer guides outward out of the way of the clamp 100.

The movement of guides 210 and 211 to let the clamp 100 pass is effected by a driving member 213 rigid with the guide 197 and engaging an arm 212 which carries the guide 211. As the guide 197 moves outwardly the arm 212 also moves, as does an arm 214 which extends inwardly from the top end of the sleeve 187. The movement of the arm 214 is communicated to the guide 210 through a roller 215 and lever 216 which with a lever 206 forms a bell crank having a sleeve 226 at its angle, the sleeve being pivoted on a pin or rod 207 extending down from a bracket on the bracket 140. A spring 227 extends from arm 206 to arm 212 and urges the guides 210 and 211 toward each other. When the tail clamp has passed through, the spring 227 causes the arms 206 and 212 to move towards one another and engage the fish. The guide 211 may move inwardly independently of guide 210, the arm 214 in that case separating from roller 215. A spring 215a extends from arm 216 to arm 214 to join them yieldingly together. This appears in Figure 22. When the movement imparted to arm 214 separates arm 214 from the roller 215 the guide 210 is allowed to press against the dorsal surface of the fish under the urging of the springs 227 and 215a. The guides 210 and 211 are thus independent of each other in this inward movement but move outwardly symmetrically. The W guide 186 moves with guide 211 and into the belly cavity of the fish as illustrated in Figure 38 as well as outward to avoid clamp 100.

As the body of the fish increases in size the two V-guides yield uniformly outwards until the belly cavity comes opposite the guide 211. This would lead to the fish being pushed outwards away from the desired center line by the guide 210 if means were not provided to prevent it. Accordingly the V-guide 211 is moved rapidly inwards to bear directly against the base of the belly cavity when the belly cavity arrives opposite the guide, as shown in Figure 37 and diagrammatically in Figure 43 and this inward movement is effected through a cam under the control of the contacting plate 145. The cam in question is shown at 217 and it is engaged by a roller 218 carried on an arm 219 rigid with a pivoted sleeve 220 with which an arm 221 is also rigid, the pivot of the sleeve being carried by a bracket 222. This arm 221 is connected by a link 223 with the arm 214 that is connected with the lever 212. The outward movement of the guide 211 to let the clamp 100 pass through is permitted by appropriate shaping of the cam 217. It will be appreciated that immediately before the outward movement, i. e., when the guides 211 and 210 are closest together, the roller 218 is not in contact with the cam 217.

The cam 217 is mounted on the spindle 225 that carries the cam 196 and thus its movement is also controlled by the contacting plate 145, that is to say, the moment at which the V-guide 211 is forced to move inwards is controlled in accordance with the length of the fish, and the timing is such that the V-guide moves in just as the belly cavity comes opposite to it. It will be appreciated that with a relatively long fish the cam 217 starts to rotate relatively late and accordingly the V-guide 211 moves in later, which is, of course, what is desired. It will be remembered that the contacting plate 145 does not engage the whole of each fish but only part of it, and accordingly it might be thought that the mechanism would be adjusted in accordance with the ratio of the parts actually engaged. This is, however, not the case, because the part that is not measured, viz., the first 300 mm., corresponds to a specific period of rotation of the cam 217 and the part that is engaged corresponds to another time period, that is to say, the period which must elapse before the cam begins to rotate. These two time periods are in effect added together by the machine so that the cam brings the V-guide 211 into operation when an interval of time has elapsed from the tail clamp being in a predetermined position, i. e., an interval that corresponds to the total length of the fish.

To aid in preventing twisting of the fish two guide fingers 204a and 204b (Figures 15, 22 and 24) are pivotally mounted on pins 205 fixed to the arm 206. The fingers 204a and 204b are urged by the connecting spring 208 toward one another and toward the fish and are provided with a tongue 209 and slot 209a, respectively, to insure symmetrical movement of the fingers (Figure 24).

The dropping of arm 145 from the end of a fish initiates a series of movements which continue through one operation. For a fish three hundred millimeters long the operation will be started immediately, and for a longer fish the operation will be delayed according to the length of the fish.

From the V-shaped guides 210 and 211 the fish moves to two pairs of horizontal knives, knives 125 and 126 at the outside of the machine, and knives 127 and 128 at the inside of the machine. The knives may be seen in Figures 14, 15, 19 and 22.

The upper knife 125 of the outer pair is secured by screws to a hub 125a which is screwed to the inner sleeve 230a which is adapted to rotate in the outer sleeve 232, which is rigid with the arm or bracket 265 and with the sleeve 263 which is rotatably secured on the lower end of the shaft 238c above described. Likewise, the upper knife 127 of the inner pair is secured to a hub 127a which is screwed to the inner sleeve 230b which is adapted to rotate in the outer sleeve 262, which is integral with the arm or bracket 266 and with the sleeve 264, which is rotatably secured on the lower end of the shaft 236c above described. The knife 126 is secured by means of a hub 126a to a shaft 231 which has a running fit in the sleeve 230a. Shaft 231 is capable of a limited amount of vertical motion in the sleeve 230a and is positively driven by a radial extension 231a which engages one side of the screw 231b in the gear 238, so that knife 126 may be driven positively but is free to be raised or lowered. Gear 238 is keyed to sleeve 230a. Gear 237 drives the knives 127 and 128 in a similar manner as knives 125 and 126, by means of extension 239a, and screw 239b. The knives are thus continuously driven by means of their respective gears 238 and 237, each of which engages one of the meshing gears 238a and 237a referred to above.

Because of the different sizes of fish to be treated the separation of the two pairs of horizontal knives must be varied and at the same time the vertical separation between the components of each pair must be varied. The vertical adjustment is diagrammatically shown in Figures 44 and 45. This adjustment is controlled by the dropping of the contacting plate 145. In the outer knives the bottom knife 126 is lowered by a displacement of shaft 231. Simultaneously knife 123 is lowered a like amount. The two knives of each pair are initially adjusted vertically to a suitable separation for fish three hundred millimeters long. For fish a thousand millimeters long the separation is increased by three millimeters. For intermediate lengths the separation is proportionate.

The downward movement of the shafts 239 and 231 is controlled by a cam 243 located under bracket 140 near the center of the machine on the same continuously rotating shaft 150a as cam 150 already described. A roller 244 mounted at the end of an arm 240 rides on the cam 243. The arm 240 is pivoted at 242 on a bracket extending from the bracket 140. A downwardly extending spring 241 urges the arm 240 to its lowermost position. Near the pivot 242 of arm 240 the arm 240 pushes downwardly on the nose of an arm 245 pivoted to the bracket 240 at 246. Arms 247 and 248 extend at right angles to the arm 245, arm 247 pressing down on the top of shaft 231 and arm 248 pressing on the top of shaft 239. When arm 240 is moved downwardly under the urging of spring 241 it presses the arm 245, arms 247 and 248, and consequently the shafts 231 and 239 downwardly.

The shaft 231 is urged upwardly by an arm 256 (Figures 15, 19 and 39) which is pivoted to a bracket 258. Bracket 258 is pivoted by sleeves 258a to the sleeve 232. A spring 260 extends between bracket 258 and arm 256 and tends to pull the two together, the end of arm 256 bearing on the bottom of 231 urging the shaft to its uppermost position against the arm 247. The shaft 239 is urged upwardly by a like arrangement of an arm 257 (Figures 19 and 40) pivoted to a bracket 259, pivotally secured to the sleeve 262 by sleeve 259a. Spring 261 holds the arm 257 against the bottom of shaft 239 and lifts the shaft upward against the arm 248.

The downward motion of the arm 240 is controlled in part by the cam 243 and in part by a latch and ratchet mechanism which limits the downward motion of the arm as the cam 243 turns.

A latch 249 is pivoted to the bracket 140 on the pin 250 (Figure 19). A ratchet 251 is mounted at the end of the arm 240 and extends upwardly therefrom to cooperate with the latch 249. A tail piece 255 on the latch 249 extends horizontally through a part 174a of the bracket 140 to a position above the end 253 of the arm, the other end of which is indicated at 173 in Figure 18. A spring 252 secured to the end of the tail piece 255 urges the latch in a counter-clockwise direction away from the ratchet 251.

When the arm 162 is caused to drop by the operation of the contacting plate 145, the end 172 of arm 162 presses downwardly on the end 173 of the lever whose other end is the arm 253. The arm 253 in lifting raises the tail piece 255 and throws the latch 249 into engagement with the ratchet 251. Inasmuch as the cam 243 turns continuously the elevation at which the arm 240 is stopped by the latch 249 and ratchet 251 is determined by the time at which the arm 162 drops and hence by the operation of the contacting plate 145 and the length of the fish being acted upon. The vertical separation of the horizontal knives is thus controlled, the separation being greater for a long fish than for a short one because for a long fish the arm 240 is lowered further by cam 243 before the latch 249 catches and stops the ratchet to arrest the downward movement of the arm 240.

The horizontal separation of the pairs of knives 125 and 126, and 127 and 128 is controlled by cams 283 and 270. The mechanism is shown in Figures 19, 31, 32 and 34. Cam 270 moves a roller 271 which is at the pivot point between two arms 272 and 273. Arm 272 is pivoted on a pin 274 secured to the bracket 140 and arm 273 extends from the roller 271 to an ear 273a on sleeve 232. As the cam 270 turns it pushes the roller 271 toward the knives and by the arm 273 moves the sleeve 232 carrying knives 125 and 126 outwardly, the sleeve 232 moving with the sleeve 263 about the pin 231. A spring 287 between sleeves 232 and 262 urges them together.

The knives 125 and 126 are moved outwardly to avoid the clamp 100, but are not further moved after the clamp has passed, to cut according to the shape of the fish, because they are on the inside of the circle around which the fish are moved; and it has been found that the best results are obtained by leaving the knives 125 and 126 in place and moving only the knives 127 and 128 according to the size of the fish.

The movement of the knives 127 and 128 toward the middle of the machine to let the clamp 100 past is controlled by a cam 283 mounted over cam 270 on the same shaft 150a. A roller 284 bears on the cam 283 and is carried by one arm 285 of a bell crank pivoted at 286 and having another arm 278. The pivot 286 of the bell crank is at the end of an arm 279. Arm 279 comprises one end of a bell crank pivoted to a vertical rod 276 and having another arm 280. The rod 276 is secured at its top end by a bracket 276b to the bracket 140. Arm 280 is pivotally secured as at 280a to a link 281 the other end of which is pivoted at 282 to an ear on sleeve 262. Sleeves 232 and 262, as stated above, are urged together by the spring 287 extending between them. The bell crank comprising arms 285 and 278 together with the arm 279 on which the bell crank is pivoted acts as a lever moved by the cam 283 to shift the knives 127 and 128 out of the way of the clamp 100. For this purpose the end 278 of the bell crank bears upon a cone 275 which is motionless during the time the clamp is passing so that the bell crank and the lever 279 moves as a unit.

The cone 275 (Figure 34) is at the bottom of a sleeve 276a about the rod 276. The arm 240 is split and extends about sleeve 276a and is connected to the sleeve by the pins 277 as indicated in Figures 19 and 34 so that sleeve and cone move vertically on rod 276 with the movement of arm 240. The change in elevation of the cone 275, by bringing a portion thereof of different diameter in contact with the end of the arm 278, thereby changing the distance between the arm 278 and the shaft 276, and, therefore, changing the angle between the arm 285 and the arm 279, the positions of the arm 280 at the ends of the swing of the arm 279 and of the knife shaft, thus causes a change in the location of the centers of the knives at the ends of the stroke of the roller 284, and thus the initial separation of the knives. The movements of the parts are shown in Figure 31. Inasmuch as the elevation of the arm 240 is determined by the length of the fish as previously described, the cone 275 thus adjusts the movement of the inner knives 127 and 128, and the initial separation between the two pairs of knives, in accordance with the length of the fish. The cam 283 is shaped to draw the knives out of the way of the clamp 100, returning them to the initial position immediately after the clamp has passed, and then to open the knives gradually as the diameter of the fish increases, the starting point to which the knives are returned after the clamp passes being determined by the elevation of the cone 275.

At the same time as the bottom knives 126 and 128 are moved downwardly it is necessary that the several guide members be moved downwardly half the amount to maintain the accuracy of the cut made by the knives. For this reason the sleeves 187 and 187a, and sleeve 226 are arranged to move vertically with their supporting rods. The arrangement of the sleeves 187 and 187a is indicated in Figure 23. A spring 288 about the top of the rod 289 upon which sleeves 187 and 187a are pivoted tends to hold the rod in its uppermost position and with it the sleeves 187 and 187a. The sleeve 226 is allowed to move vertically by similar arrangement.

The downward movement of the sleeves carrying the several guides is caused by an arm 290 which is rigid with the arm 245 previously described carrying arms 247 and 248 controlling the elevation of the knife spindles. The lower end of the arm 290 is bent toward the right as shown in Figures 15 and 16 and rests under a roller 291 at the end of a lever 292. Lever 292 is rigid with a shaft 293 which is pivoted in brackets attached on the bracket 140. The shaft 293 bears rigidly secured near its ends two forked arms 294 and 295. Arm 294 straddles sleeve 226. A collar 294a rides in a slot in the sleeve and is pivoted to the forked arm 294 as shown in Figure 21. Arm 295 likewise straddles sleeve 187 and acts upon sleeve 187 through a similar collar 295a.

When the arm 245 is depressed to lower the knife spindles the arm 290 moves to the right as shown in Figure 15, lifting the roller 291 and rotating the arm 292 clockwise. The forked arms 294 and 295 thus force the sleeves 187 and 187a and 226 downward to lower the several guides which are carried by those sleeves.

From the horizontal knives the fish passes to two guides (see Figures 25 and 39) which enter the cuts made by the knives. The guides on the belly side of the fish further serve to spread the belly flaps apart. The guides consist of an upper part 300 and a lower part 301 as shown in Figure 15. The upper guide 300 is secured to the arm 256 at 302. The lower guide 301 is fixed to a pivot in 303 to which is also secured the lever 256, and by which the lever 256 and the guide 301 are pivoted to the arm 258. In the operation of the device the arm 256 is pressed downwardly when the shaft 231 is lowered. The movement is transmitted through the pin 303 to the guide 301, lowering the point 304 a distance necessary to enter the cut made by the lower knife 126. The guide 300 remains stationary, as the knife 125 does not move vertically.

The guides for the cuts on the back side of the fish comprise two parts 305 and 306. They are shown in Figures 25 and 40. These guides extend from adjacent the knives 127 and 128 to a position close to the inclined knives 129 and 130. The top guide 305 is secured to the arm 259 at point 309. The lower guide 306 is secured to a pivot pin 307 passing through arm 259 and to which is also secured the arm 257 which serves to raise the shaft 239. When the arm 257 is lowered by the pressure of the shaft 239 the point 308 of the lower guide 306 drops to follow the lower knife 128.

As the clamp passes the guides 300 and 301 the cam 79 engages a roller 310 on an extension 310a of the arm 258, moving the arm 258 and the guides out of the way of the clamp. At the same time the cam 85 engages a roller 312 on an extension 311 of arm 259 to move the guides 305 and 306 out of the way of the clamp. A spring 313 extending from arm 258 to arm 259 holds the arms and the guide members toward the fish.

In order that the inclined knives 129 and 130 shall not cut into the flesh of the trunk of the fish and yet may operate in the belly cavity of the fish to cut around the bones at that part, the flesh at the trunk of the fish is held away from the knives by two flaps 314 and 315 hinged to plates 316 and 317. For this structure see Figures 26 and 27. When the belly cavity has reached the knives the flaps 314 and 315 are allowed to pivot, releasing the flesh for action by the knives.

The upper flap 314 and the lower flap 315 are connected by lugs 314a and 315a, respectively, to pins 319a and 319b, respectively, carried by an arm 319. The flaps are made rigid or released by this arm 319 which is secured to a rod 320 pivoted in a bearing 321 attached to a bracket 318, and in the bent end of the bracket 318. An upper bearing 322 for the rod 320 is secured to an arm 323 which extends from the side of the sleeve 348.

When the rod 320 turns the flaps 314 and 315 are moved from the position shown in Figure 26 to that shown in Figure 27. This rocking to release the flesh so that the knives 129 and 130 can act upon it must begin at the moment that the belly cavity arrives at the knives, and must thereafter continue in order to allow for the increasing size of the belly flaps toward the head end of the fish. For this purpose the rod 320 is controlled by two cams 324 and 325 (Figure 14). Cam 324 is mounted above the bracket 141 and is driven from the central shaft 4 through gear 233a, idler 233b, gear 254a fixed to shaft 354¹, gear 354b fixed to shaft 353, gear 354c fixed to the same shaft, and gear 354d, which is fixed to shaft 324a, to which cam 324 is fixed. The cam moves a roller 326 at the end of an arm 327. The arm 327 is pivoted at 329 to a bracket 329a on the bracket 141. An extension 330 of the arm 327 provides an abutment for pin 331 on one arm 332 of a bell crank the other arm of which is indicated at 334 (Figure 15). The bell crank comprising arms 332 and 334 is secured non-rotatively to the top of rod 320. A spring 328 urges the arm 327 counter-clockwise about the pivot 329 as shown in Figure 14. The cam 324 acts against the force of the spring 328 and moves the extension 330 to allow the pin 331 and the arms 332 and 334 to move counter-clockwise, turning the rod 320 and releasing the flaps 314 and 315. The cam 324 turns continuously and is adjusted so that the pin 331 is released by the extension 330 at the moment when the contacting plate 145 first drops. Cam 324 would thus allow the rod 320 to rotate at the proper time for a fish three hundred millimeters long. A spring 333 between the arm 332 and the end of the bracket 141 causes the arm 332 to move and rotate rod 320 when the arm 332 and arm 334 are free to move.

After the pin 331 is released if the fish being treated is more than three hundred millimeters long the rotation of the rod 320 must be delayed a time proportionate to the length of the fish. This further delay is secured by cam 325 which rotates with the spindle 225, controlled by the crown wheel 171 and the latch 168. The arm 334 secured to rod 320 abuts against a pin 335, at the end of an arm 336. Arm 336 is rigid with a sleeve 337 which is pivoted on a pin extending above the pivot 242 of the arm 240 and is secured to a bracket carried by the bracket 140. An extension 338 of arm 336 carries a roller 340 which rides upon the cam 325. A spring 339 urges the arm 336 and the extension 338 in a clockwise direction as seen in Figure 14. The rotation of cam 325 is instituted by the dropping of the lever 145 from the end of a fish. After the cam is rotated the selected distance proportionate to the length of the fish it allows the arm 336 with its extension 338 to rotate in a clockwise direction under the urge of the spring 339, thus releasing the arm 334 from the pin 335 and allowing the rod 320 to be rotated to bring the flaps 314 and 315 into the position shown in Figure 27. The distance from the tail to the belly cavity is a fairly uniform part of the length of the fish and cam 325 is shaped to take advantage of such proportion.

If the fish being dressed were three hundred millimeters long the cams 324 and 325 would begin to rotate at the same moment and the arms 330 and 336 would release the arms 332 and 334 at the same time. When, as is usually the case, the fish being dressed is more than three hundred millimeters long the cam 324 causes the release of arm 332 at the three hundred millimeter point, but the arm 334 is held against rotation through the action of cam 325 until the belly cavity of the fish has reached the inclined knives.

The guides 305 and 306 support the back of the fish opposite the flaps 314 and 315.

The inclined knives 129 and 130, together with the guides just described and the operating means for the two, are carried as a single unit. This is shown in Figures 14, 15, 20, 28, 29 and 30. Knife 129 is mounted upon a shaft 341, and knife 130 upon a shaft 342. Shaft 341 turns in an eccentric bushing 343 and shaft 342 turns in an eccentric bushing 344. Bushing 343 is carried in a sleeve 345, the bushing 344 in a sleeve 346. Sleeves 345 and 346 are joined by a web 347. A similar web 355 joins sleeve 345 to sleeve 348 previously mentioned. A drive shaft 349 rotates within sleeve 348 and is driven from shaft 353 through bevel gear 352a fixed thereto, bevel gear 352b fixed to one end of shaft 351, bevel gear 350a fixed to the other end of shaft 351, bevel gear 350b rotatably mounted upon shaft 362, and bevel gear 350c fixed to the upper end of shaft 349.

At the bottom of the shaft 349 and sleeve 348 a beveled gear 356 is secured for rotation with the shaft. A beveled gear 357 is secured by key 359 to the shaft 341 and meshes with the gear 356 for rotation therewith. A like gear 358 secured by a key 360 to shaft 342 meshes with gear 357 so that all three gears, 356, 357 and 358 rotate together.

The entire knife and guide unit is carried by two arms 323 and 361 of which arm 323 has been referred to above, and which are unitary with the sleeve 348 and which are pivoted to shaft 362. Arm 323 has been referred to above in connection with the flaps 314 and 315. Shaft 362 is carried by a bracket 363 secured to the bracket 141. The unit is thus pivoted on the shaft 362 to allow the clamps 100 to pass. The knife and guide unit is rocked outwardly through the action of cam 368, which is mounted on shaft 324a. An arm 364 is pivoted to an ear 348a on sleeve 348 (Figure 20). A bell crank 365 has its lower arm pivoted by a stud 364a to the arm 364 and carries at the ends of its upper arm a roller 367 riding on the cam 368. The bell crank is pivoted at 366 to a projection from the bracket 141 so that when the cam 368 raises the roller 367 the knife and guide unit is swung inwardly into active position. A spring 369 attached to the lower end of the lower arm of bell crank 365 and to an extension from the bracket 141 urges the lower arm of the bell crank 365 outwardly, and when the cam 368 allows the roller 367 to drop, moves the knife and guide unit outwardly to allow the clamps to pass.

As soon as the clamp 100 is past, the cam 368 causes the knife and guide unit to be drawn in again into its active position.

To allow for the increase in the size of the backbone of a fish the knives 129 and 130 move slowly apart as the fish passes between them. The spacing between them is originally the same in all cases whatever the size of the fish and the rate at which they move apart is always the same. Their separation is brought about by a rotation of the eccentric bushings 343 and 344. Bushing 343 is rotated by an arm 370 and bushing 344 by an arm 371. A cross bar 372 is joined to the arms 370 and 371 by ball and socket joints and provides for simultaneous movement of the two bushings. Cross bar 372 carries an arm 373 which is secured by a universal joint 375 to a rod 374 extending upwards from the knife assembly. A second universal joint 376 secures the top end of rod 374 to a lever 377 pivoted at 378 to the bracket 141. The left end of arm 377 as shown in Figure 20 carries a roller 379 which bears against a cam 380 on the same shaft with cams 324 and 368. The cam is located on the shaft in such position that when the knives first cut into the tail of a fish the arm 377 is rotated clockwise as shown in dot-and-dash lines in Figure 20. The rod 374 is pressed downward, rotating the sleeves 343 and 344 to bring the knives in their initial position close together. As the fish passes the knives, cam 380 rotates, causing the sleeves 343 and 344 to be turned, carrying the knives gradually apart. The operation of the inclined knives 129 and 130 is the same regardless of the length of the fish, hence they separate continuously and at the same rate during the whole time the fish is passing.

Past the knives 129 and 130 the clamp 100 draws the fish on to a sheet metal support 382 similar to supports 122 and 30 and comprising plates 382a and 382b. The fish, drawn by the clamp 100 over the support 382, may be operated on by any suitable instrumentalities, not shown, to treat the fish further, if desired.

The fillets tend to cling to the backbone, and may be removed by hand or any suitable means.

The clamp 100 carries the tail and backbone around to the ramp 86a, which causes the clamp to open, clearing the clamp for a repetition of the cycle of steps.

The invention is hereby claimed as follows:

1. The process of treating in succession in a single machine a plurality of fish of varying length which comprises the steps of acting on each fish by cuts longitudinal of the fish, the spacing of the cuts varying according to the length of the fish.

2. The process of treating in succession in a single machine a plurality of fish of varying lengths which comprises the steps of moving each fish, making filleting cuts in the fish down to the backbone thereof, and varying the depth of the cuts in accordance with the size of the fish.

3. The process of treating a fish which comprises grasping the tail of the fish, pulling the fish longitudinally along a selected path, creating a drag on the body of the fish to straighten and maintain straight the backbone of the fish, and making filleting cuts in the body of the fish while it is subjected to the said drag.

4. The process of treating a fish which comprises grasping the tail of the fish, pulling the fish along a selected path, centering and holding the fish for action on both sides thereof by resiliently applying symmetrical dragging pressure along the outside of the fish in a plurality of planes as the fish is moved along such path, and making filleting cuts in the body of the fish while it is subjected to the said drag.

5. In a machine for treating fish, means for moving the fish along a selected path past a plurality of stations, fish engaging means at one of said stations, and means at a plurality of the other stations for acting upon said fish, a plurality of said acting means being controlled by said engaging means in accordance with the fish length so engaged.

6. The process of filleting a fish which comprises grasping the fish at one end, pulling it along a selected path, meanwhile maintaining the backbone of the fish substantially straight, and making filleting cuts in the fish while the backbone is maintained substantially straight.

7. In a machine for filleting fish, means to make filleting cuts in the fish, means to pull the fish endwise into engagement with said cut-making means, and resilient guides to support the fish immediately before it is engaged by said cut-making means, said guides being so shaped and arranged as to tend to straighten the backbone of the fish.

8. In a fish filleting machine, means to make filleting cuts in the fish, means to pull the fish endwise into engagement with said cut-making means, adjustable guides adapted to support a fish of varying size, and means to cause said guides to exert a braking action on the fish to aline the backbone of the fish in a substantially straight line immediately before it is engaged by said cut-making means.

9. In a fish filleting machine, means to make filleting cuts in the fish, means to pull the fish into engagement with said cut-making means, resilient guides to support the fish during movement, associated and arranged as to tend to center and straighten the backbone of the fish immediately before it is engaged by said cut-making means, and means to restrict the centering line of the guides to substantial coincidence with the center plane of said cut-making means.

10. In a machine for treating fish, the structure comprising means for holding a fish at one end, means for moving the holding means to pull the fish adjacent at least one fish dressing tool, means to cause said dressing tool to engage the fish and complete a dressing step thereon while in said position, adjustable guides associated with the dressing tool, and means to cause said guides to support said fish completely at a station just before the dressing tool and to feed the fish to said tool with the backbone positioned substantially in a single plane.

11. In a machine for treating fish, a pair of inclined rotary disc knives adapted to act along the walls of the belly cavity of a fish, means to produce relative movement between said fish and said knives to cause cutting along said walls, and means to alter the distance between said knives at their points of closest approach during engagement with the fish whereby to allow for the varying thickness of the backbone.

12. In a fish treating machine, means to hold a fish at one end and move it in a pre-selected path, filleting means adjacent said path to produce at least one cut at a predetermined position longitudinally of the fish, guide means arranged adjacent said path, means to cause said guide means to enter said cut whereby to guide the fish in accordance with said cut, and means to present a fish so guided to subsequent treating instrumentalities.

13. In a fish treating machine, means to move a fish in a predetermined path, treating instrumentalities adjacent said path, said instrumentalities comprising a cutting means, means to cause said cutting means to make at least one cut longitudinally of said fish whereby to form a flap, guide means rearwardly of said knives, means to cause said guide means to enter said cut, and a knife inclined to said cut, the guide means being curved to guide said flap into position for cutting by said inclined knife.

14. In a machine for dressing fish, means to act upon a fish to produce a flap portion, a guide member engaging said flap, a cutting blade arranged for operation in a predetermined plane, said guide being arranged to guide and support said flap adjacent but out of contact with the plane of said knife, and means to release a portion of said guide adjacent a pre-selected area of flap to permit said area to come in contact with and be severed selectively by said knife.

15. In a machine for dressing fish or the like, a clamp for engaging a fish at one end thereof, means to move said clamp to convey said fish adjacent at least one fish dressing instrumentality, the clamp being mounted to turn in a plane generally parallel to its plane of travel, means at a point in said travel to cause said clamp to turn to a position approximately 90 degrees to its direction of travel, means to cause said clamp to grasp the end of a fish in said position, and means subsequently to cause said clamp to turn to normal fish pulling position.

16. In a machine for filleting fish, a pair of parallel, co-axial, spaced disc knives for making filleting cuts in a fish, means for engaging a fish throughout a portion of the length of the fish, and means controlled by said engaging means for varying the axial spacing of the knives from one another in accordance with the length of the fish so engaged.

17. In a machine for filleting fish, a pair of co-axial, parallel, spaced disc knives adapted to make filleting cuts in the back of a fish, a second pair of co-axial, parallel, spaced disc knives adapted to make filleting cuts in the belly side of the said fish and arranged with their axes parallel to that of the first pair, means for engaging a fish throughout a portion of the length of the fish, means controlled by said engaging means for varying the axial distance of the knives in each pair apart from one another in accordance with the length of the fish so engaged, and means also controlled by said engaging means for varying the distance between the axes of the two pairs of knives in accordance with the length of the fish so engaged.

18. In a machine for treating fish, a pair of inclined knives adapted to act along the belly cavity walls of a fish, means to produce relative movement between said fish and said knives to cause cutting along said walls, and means to alter the distance between said knives during engagement with the fish while maintaining constant the angle between them whereby to allow for the varying thickness of the backbone.

19. In a machine for treating fish, a pair of inclined knives adapted to act along the belly cavity walls of a fish, means to produce relative movement between said fish and knives to cause cutting along said walls, and means to alter the distance between said knives during engagement with the fish continuously and at a constant rate whereby to allow for the varying thickness of the backbone.

20. The process of treating fish which comprises the steps of moving the fish tail first along a selected path, controlling the positioning of filleting knives in accordance with the interval of movement of the entire fish along a portion of the selected path, and presenting the fish for filleting in accordance with such positioning as the fish continues to move along such path.

21. The process of treating fish which comprises the steps of moving the fish along a selected path, controlling the separation of filleting knives in accordance with the interval of movement of the fish along a portion of the selected path, and presenting the fish for filleting in accordance with such separation whereby the separation of the filleting cuts is adjusted in accordance with the length of the fish.

22. The process of treating a fish which comprises controlling the positioning of filleting knives in accordance with the length of a fish, presenting the fish for filleting in accordance with such positioning, and cutting fillets from the fish by longitudinal cuts on either side of the spines and to the backbone of the fish, the separation of the cuts being proportioned according to the length of the fish.

23. In a fish treating machine having a plurality of instrumentalities to act on a fish, means to adjust the said instrumentalities in accordance with the length of the fish, and means to present the fish to the said instrumentalities in accordance with the said adjustment whereby the action of the instrumentalities upon the fish is proportioned according to the length of the fish.

24. The process of treating a fish which comprises grasping the tail of the fish, pulling the fish longitudinally along a selected path, subjecting to tension a length of the fish extending rearwards from the tail while leaving said length unsupported except at each end thereof, and making filleting cuts in said unsupported length of the fish.

RUDOLF BAADER.